(12) United States Patent
Taveira et al.

(10) Patent No.: US 11,738,775 B2
(45) Date of Patent: Aug. 29, 2023

(54) ROUTE OPTIMIZATION FOR VEHICLES

(71) Applicant: QUALCOMM Incorporated, San Diego, CA (US)

(72) Inventors: Michael Franco Taveira, San Diego, CA (US); Damir Didjusto, San Diego, CA (US); Michael Joshua Shomin, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/135,092

(22) Filed: Dec. 28, 2020

(65) Prior Publication Data

US 2022/0204050 A1    Jun. 30, 2022

(51) Int. Cl.
*B60W 60/00*  (2020.01)
*B60W 40/08*  (2012.01)
(Continued)

(52) U.S. Cl.
CPC ...... *B60W 60/00253* (2020.02); *B60W 40/08* (2013.01); *B60W 60/0013* (2020.02); *B60W 60/0023* (2020.02); *G01C 21/3461* (2013.01); *G01C 21/3469* (2013.01); *G01C 21/3476* (2013.01); *G01C 21/3492* (2013.01); *G01C 21/3679* (2013.01); *G01C 21/3691* (2013.01); *G08G 1/133* (2013.01);
(Continued)

(58) Field of Classification Search
CPC ....... B60W 60/00253; B60W 60/0013; B60W 60/0023; B60W 40/08; B60W 2555/20; B60W 2540/221; B60W 2040/0872; G01C 21/3461; G01C 21/3469; G01C 21/3476; G01C 21/3492; G01C 21/3679; G01C 21/3691; G08G 1/133
See application file for complete search history.

(56) References Cited

U.S. PATENT DOCUMENTS 6,385,537 B2    5/2002  Gaspard, II
7,174,154 B2    2/2007  Ehlers
(Continued)

FOREIGN PATENT DOCUMENTS

WO    WO-2019172915 A1    9/2019

OTHER PUBLICATIONS

International Search Report and Written Opinion—PCT/US2021/056421—ISA/EPO—dated Mar. 10, 2022.

*Primary Examiner* — Anne Marie Antonucci
*Assistant Examiner* — Jingli Wang
(74) *Attorney, Agent, or Firm* — Qualcomm Incorporated

(57) ABSTRACT

In some implementations, a route selection system obtains a first scheduled time for a first event at a venue for a passenger of an autonomous vehicle. The system determines whether the autonomous vehicle will arrive at the venue by the first scheduled time. The system obtains, in response to a determination that the autonomous vehicle will not arrive at the venue by the first scheduled time, a second scheduled time for a second event at the venue. The system determines a route to the venue based on one or more preferences of the passenger, one or more preferences of an operator of the autonomous vehicle, or any combination thereof, wherein the determined route is configured for arrival of the passenger at the venue after the first scheduled time and at or within a time period before the second scheduled time.

30 Claims, 7 Drawing Sheets

(51) Int. Cl.
   *G01C 21/34*         (2006.01)
   *G01C 21/36*         (2006.01)
   *G08G 1/133*         (2006.01)

(52) U.S. Cl.
   CPC .............. *B60W 2040/0872* (2013.01); *B60W 2540/221* (2020.02); *B60W 2555/20* (2020.02)

(56) References Cited

U.S. PATENT DOCUMENTS

| | | |
|---|---|---|
| 8,996,304 B2 | 3/2015 | Needham et al. |
| 2002/0128773 A1* | 9/2002 | Chowanic .......... G01C 21/3484 |
| | | 701/414 |
| 2006/0155591 A1* | 7/2006 | Altaf .................... G06Q 10/109 |
| | | 705/5 |
| 2016/0328745 A1 | 11/2016 | Martin et al. |
| 2017/0108339 A1 | 4/2017 | Silverstein |
| 2021/0293565 A1* | 9/2021 | Reed .................. G01C 21/3461 |

* cited by examiner

ROUTE OPTIMIZATION FOR VEHICLES

TECHNICAL FIELD

This disclosure relates generally to autonomous vehicles and, more specifically, to optimizing route selection for autonomous vehicles configured for passenger service.

DESCRIPTION OF THE RELATED TECHNOLOGY

Autonomous vehicles can operate in an autonomous mode or semi-autonomous mode during which the autonomous vehicle navigates through an environment with little or no input from a driver. These autonomous vehicles typically include light detection and ranging (LIDAR) devices, cameras, and other sensing devices that can survey a surrounding environment and generate detailed information indicating the sizes, shapes, locations, orientations, movements, and other attributes of environmental features (e.g., mountains, rivers, lakes, cliffs, and so on), roadway features (e.g., traffic signs, street lamps, intersections, curves, bridges, and so on), structures (e.g., buildings, houses, stadiums, and so on), objects (e.g., other vehicles, pedestrians, and so on), potential hazards (e.g., uneven pavement, potholes, construction barriers, and so on), and other features of the surrounding environment. The autonomous vehicle can use this detailed information to travel along a route in a manner that avoids other objects and potential hazards while obeying traffic laws and traffic signals.

An autonomous vehicle tasked with transporting a passenger to a venue at or before a scheduled time for an event at the venue may retrieve real-time traffic conditions and weather information to select a suitable route from a passenger pick-up location to the venue. When unexpected conditions (e.g., traffic jams, hazardous road conditions, sudden weather changes, etc.) preclude the autonomous vehicle from transporting the passenger to the venue at or before the scheduled time, the passenger may cancel participation in the event or select a later occurrence of the event at the venue. As such, the passenger may have an unexpected amount of free time.

SUMMARY

The systems, methods, and devices of this disclosure may be used to select and dynamically update a route for transporting a passenger to an event at a venue based on one or more determinations that a vehicle transporting the passenger will not arrive at the venue at or before a scheduled time for the event. In some implementations, the system may include a memory communicably coupled to one or more processors. In one implementation, the one or more processors may be configured to obtain a first scheduled time for a first event at a venue for a passenger of an autonomous vehicle. The one or more processors may be configured to determine whether the autonomous vehicle will arrive at the venue by the first scheduled time. The one or more processors may be configured to obtain, in response to a determination that the autonomous vehicle will not arrive at the venue by the first scheduled time, a second scheduled time for a second event at the venue. The one or more processors may be configured to determine a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

In various implementations, the one or more passenger preferences may include a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof. In some aspects, the one or more passenger preferences may be received from a profile of the passenger stored in a network entity, a mobile computing device associated with the passenger, a user interface of the autonomous vehicle, a verbal indication by the passenger, or any combination thereof.

In various implementations, the one or more operator preferences may include a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof. In some aspects, the operator may be associated with a crowdsourcing application, and the one or more operator preferences may include a preference for routes associated with a greatest amount of revenue attributed to services provided by the vehicle.

In various implementations, the second scheduled time may be based at least in part on an estimated travel time of the passenger from an exit point of the autonomous vehicle at or near the venue to an entry point of the second event. In some implementations, the estimated travel time may be based at least in part on a physical attribute of the passenger, a presence of infants or children with the passenger, an age of the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof. In addition, or in the alternative, the estimated travel time may be based at least in part on wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof. In some aspects, the one or more processors may be further configured to determine the estimated travel time based on a willingness of the passenger to run from the exit point of the autonomous vehicle to the entry point of the second event, a priority level of the passenger's admission to the second event, changes in wait times to enter the second event, a change in location of the second event, or any combination thereof.

In some implementations, the venue may be a transportation terminal. In some aspects, the estimated travel time may be based at least in part on wait times for checking baggage, wait times for obtaining a travel ticket or boarding pass, wait times for passing through security lines, delays associated with traveling with one or more pets, wait times for food service, a size of the transportation terminal, a layout of the transportation terminal, entry points of the transportation terminal, a level of activity at the transportation terminal, a level of the passenger's familiarity with the transportation terminal, a security pre-screening status of the passenger, a pre-boarding status of the passenger, an absence of carry-on luggage of the passenger, a preferred traveler status of the passenger, or any combination thereof. In one implementation, the one or more processors may be further configured to determine the estimated travel time based on changes in the wait times, changes in departure gates, delays in scheduled arrivals or departures at the transportation terminal, or any combination thereof. In some aspects, the one or more processors may be further configured to determine another route to the venue in response to the estimated travel time exceeding a threshold value.

In some implementations, the venue may be an airport, the first event may be a first airline flight to a destination, and the second event may be a second airline flight to the destination. In some aspects, the one or more processors may be further configured to retrieve a flight number of the first airline flight, an airline company associated with the first airline flight, a departure time of the first airline flight, a departure gate of the first airline flight from a mobile computing device of the passenger, or any combination thereof. In some other aspects, the one or more processors may be further configured to receive real-time flight information including a flight number of the second airline flight, an airline company associated with the second airline flight, a departure time of the second airline flight, a departure gate of the second airline flight, or any combination thereof. In some other implementations, the venue may be a movie theater complex, the first event may be a first showing of a movie at a first time, and the second event may be a second showing of the movie at a second time that is after the first time.

In some implementations, the one or more processors may be further configured to present, to the passenger, a plurality of routes configured for the arrival of the passenger at the venue after the scheduled time for the first event and at or within a time period before the scheduled time for the second event. The one or more processors may also be configured to obtain a selection of one of the presented routes from the passenger. The one or more processors may also be configured to determine the route to the venue based on the passenger selection.

In various implementations, a method of determining routes for an autonomous vehicle is disclosed. In one implementation, the method may include obtaining a first scheduled time for a first event at a venue for a passenger. The method may include determining whether the autonomous vehicle will arrive at the venue by the first scheduled time. The method may include obtaining a second scheduled time for a second event at the venue in response to a determination that the autonomous vehicle will not arrive at the venue by the first scheduled time. The method may include determining a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

In various implementations, the one or more passenger preferences may include a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof. In some aspects, the one or more passenger preferences may be received from a profile of the passenger stored in a network entity, a mobile computing device associated with the passenger, a user interface of the autonomous vehicle, a verbal indication by the passenger, or any combination thereof.

In various implementations, the one or more operator preferences may include a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof. In some aspects, the operator may be associated with a crowdsourcing application, and the one or more operator preferences may include a preference for routes associated with a greatest amount of revenue attributed to services provided by the vehicle.

In various implementations, the second scheduled time may be based at least in part on an estimated travel time of the passenger from an exit point of the autonomous vehicle at or near the venue to an entry point of the second event. In some implementations, the estimated travel time may be based at least in part on a physical attribute of the passenger, a presence of infants or children with the passenger, an age of the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof. In addition, or in the alternative, the estimated travel time may be based at least in part on wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof. In some aspects, the method may also include determining the estimated travel time based on a willingness of the passenger to run from the exit point of the autonomous vehicle to the entry point of the second event, a priority level of the passenger's admission to the second event, changes in wait times to enter the second event, a change in location of the second event, or any combination thereof.

In some implementations, the venue may be a transportation terminal. In some aspects, the estimated travel time may be based at least in part on wait times for checking baggage, wait times for obtaining a travel ticket or boarding pass, wait times for passing through security lines, delays associated with traveling with one or more pets, wait times for food service, a size of the transportation terminal, a layout of the transportation terminal, entry points of the transportation terminal, a level of activity at the transportation terminal, a level of the passenger's familiarity with the transportation terminal, a security pre-screening status of the passenger, a pre-boarding status of the passenger, an absence of carry-on luggage of the passenger, a preferred traveler status of the passenger, or any combination thereof. In one implementation, the method may also include determining the estimated travel time based on changes in the wait times, changes in departure gates, delays in scheduled arrivals or departures at the transportation terminal, or any combination thereof. In some aspects, the method may also include determining another route to the venue in response to the estimated travel time exceeding a threshold value.

In some implementations, the venue may be an airport, the first event may be a first airline flight to a destination, and the second event may be a second airline flight to the destination. In some aspects, the method may also include retrieving a flight number of the first airline flight, an airline company associated with the first airline flight, a departure time of the first airline flight, a departure gate of the first airline flight from a mobile computing device of the passenger, or any combination thereof. In some other aspects, the method may also include retrieving real-time flight information including a flight number of the second airline flight, an airline company associated with the second airline flight, a departure time of the second airline flight, a departure gate of the second airline flight, or any combination thereof. In some other implementations, the venue may be a movie theater complex, the first event may be a first showing of a movie at a first time, and the second event may be a second showing of the movie at a second time that is after the first time.

In some implementations, the method may also include presenting, to the passenger, a plurality of routes configured for the arrival of the passenger at the venue after the scheduled time for the first event and at or within a time period before the scheduled time for the second event. The method may also include obtaining a selection of one of the presented routes from the passenger. The method may also include determining the route to the venue based on the passenger selection.

In various implementations, a system is disclosed that may include means for obtaining a first scheduled time for a first event at a venue for a passenger of an autonomous vehicle. The system may include means for determining whether the autonomous vehicle will arrive at the venue by the first scheduled time. The system may include means for obtaining a second scheduled time for a second event at the venue in response to a determination that the autonomous vehicle will not arrive at the venue by the first scheduled time. The system may include means for determining a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

In various implementations, the one or more passenger preferences may include a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof. In some aspects, the one or more passenger preferences may be received from a profile of the passenger stored in a network entity, a mobile computing device associated with the passenger, a user interface of the autonomous vehicle, a verbal indication by the passenger, or any combination thereof.

In various implementations, the one or more operator preferences may include a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof. In some aspects, the operator may be associated with a crowdsourcing application, and the one or more operator preferences may include a preference for routes associated with a greatest amount of revenue attributed to services provided by the vehicle.

In various implementations, the second scheduled time may be based at least in part on an estimated travel time of the passenger from an exit point of the autonomous vehicle at or near the venue to an entry point of the second event. In some implementations, the estimated travel time may be based at least in part on a physical attribute of the passenger, a presence of infants or children with the passenger, an age of the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof. In addition, or in the alternative, the estimated travel time may be based at least in part on wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof. In some aspects, the system may also include means for determining the estimated travel time based on a willingness of the passenger to run from the exit point of the autonomous vehicle to the entry point of the second event, a priority level of the passenger's admission to the second event, changes in wait times to enter the second event, a change in location of the second event, or any combination thereof.

In some implementations, the venue may be a transportation terminal. In some aspects, the estimated travel time may be based at least in part on wait times for checking baggage, wait times for obtaining a travel ticket or boarding pass, wait times for passing through security lines, delays associated with traveling with one or more pets, wait times for food service, a size of the transportation terminal, a layout of the transportation terminal, entry points of the transportation terminal, a level of activity at the transportation terminal, a level of the passenger's familiarity with the transportation terminal, a security pre-screening status of the passenger, a pre-boarding status of the passenger, an absence of carry-on luggage of the passenger, a preferred traveler status of the passenger, or any combination thereof. In one implementation, the system may also include means for determining the estimated travel time based on changes in the wait times, changes in departure gates, delays in scheduled arrivals or departures at the transportation terminal, or any combination thereof. In some aspects, the system may also include means for determining another route to the venue in response to the estimated travel time exceeding a threshold value.

In some implementations, the venue may be an airport, the first event may be a first airline flight to a destination, and the second event may be a second airline flight to the destination. In some aspects, the system may also include means for retrieving a flight number of the first airline flight, an airline company associated with the first airline flight, a departure time of the first airline flight, a departure gate of the first airline flight from a mobile computing device of the passenger, or any combination thereof. In some other aspects, the system may also include means for retrieving real-time flight information including a flight number of the second airline flight, an airline company associated with the second airline flight, a departure time of the second airline flight, a departure gate of the second airline flight, or any combination thereof. In some other implementations, the venue may be a movie theater complex, the first event may be a first showing of a movie at a first time, and the second event may be a second showing of the movie at a second time that is after the first time.

In some implementations, the system may also include means for presenting, to the passenger, a plurality of routes configured for the arrival of the passenger at the venue after the scheduled time for the first event and at or within a time period before the scheduled time for the second event. The system may also include means for obtaining a selection of one of the presented routes from the passenger. The system may also include means for determining the route to the venue based on the passenger selection.

In various implementations, a non-transitory computer-readable medium storing computer executable code is disclosed. In one implementation, the computer executable code may include obtaining a first scheduled time for a first event at a venue for a passenger of an autonomous vehicle. The computer executable code may include determining whether the autonomous vehicle will arrive at the venue by the first scheduled time. The computer executable code may include obtaining a second scheduled time for a second event at the venue in response to a determination that the autonomous vehicle will not arrive at the venue by the first scheduled time. The computer executable code may include determining a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

In various implementations, the one or more passenger preferences may include a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof. In some aspects, the one or more passenger preferences may be received from a profile of the passenger stored in a network entity, a mobile computing device associated with the passenger, a user interface of the autonomous vehicle, a verbal indication by the passenger, or any combination thereof.

In various implementations, the one or more operator preferences may include a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof. In some aspects, the operator may be associated with a crowdsourcing application, and the one or more operator preferences may include a preference for routes associated with a greatest amount of revenue attributed to services provided by the vehicle.

In various implementations, the second scheduled time may be based at least in part on an estimated travel time of the passenger from an exit point of the autonomous vehicle at or near the venue to an entry point of the second event. In some implementations, the estimated travel time may be based at least in part on a physical attribute of the passenger, a presence of infants or children with the passenger, an age of the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof. In other implementations, the estimated travel time may be based at least in part on wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof. In some aspects, the computer executable code may include determining the estimated travel time based on a willingness of the passenger to run from the exit point of the autonomous vehicle to the entry point of the second event, a priority level of the passenger's admission to the second event, changes in wait times to enter the second event, a change in location of the second event, or any combination thereof.

In some instances, the venue may be a transportation terminal. In some aspects, the estimated travel time may be based at least in part on wait times for checking baggage, wait times for obtaining a travel ticket or boarding pass, wait times for passing through security lines, delays associated with traveling with one or more pets, wait times for food service, a size of the transportation terminal, a layout of the transportation terminal, entry points of the transportation terminal, a level of activity at the transportation terminal, a level of the passenger's familiarity with the transportation terminal, a security pre-screening status of the passenger, a pre-boarding status of the passenger, an absence of carry-on luggage of the passenger, a preferred traveler status of the passenger, or any combination thereof. In some implementations, the computer executable code may include determining the estimated travel time based on changes in the wait times, changes in departure gates, delays in scheduled arrivals or departures at the transportation terminal, or any combination thereof. In some aspects, the computer executable code may include determining another route to the venue in response to the estimated travel time exceeding a threshold value.

In some implementations, the venue may be an airport, the first event may be a first airline flight to a destination, and the second event may be a second airline flight to the destination. In some aspects, the computer executable code may include retrieving a flight number of the first airline flight, an airline company associated with the first airline flight, a departure time of the first airline flight, a departure gate of the first airline flight from a mobile computing device of the passenger, or any combination thereof. In some other aspects, the computer executable code may include retrieving real-time flight information including a flight number of the second airline flight, an airline company associated with the second airline flight, a departure time of the second airline flight, a departure gate of the second airline flight, or any combination thereof. In some other implementations, the venue may be a movie theater complex, the first event may be a first showing of a movie at a first time, and the second event may be a second showing of the movie at a second time that is after the first time.

In some implementations, the computer executable code may also include presenting, to the passenger, a plurality of routes configured for the arrival of the passenger at the venue after the scheduled time for the first event and at or within a time period before the scheduled time for the second event. The computer executable code may also include obtaining a selection of one of the presented routes from the passenger. The computer executable code may also include determining the route to the venue based on the passenger selection.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
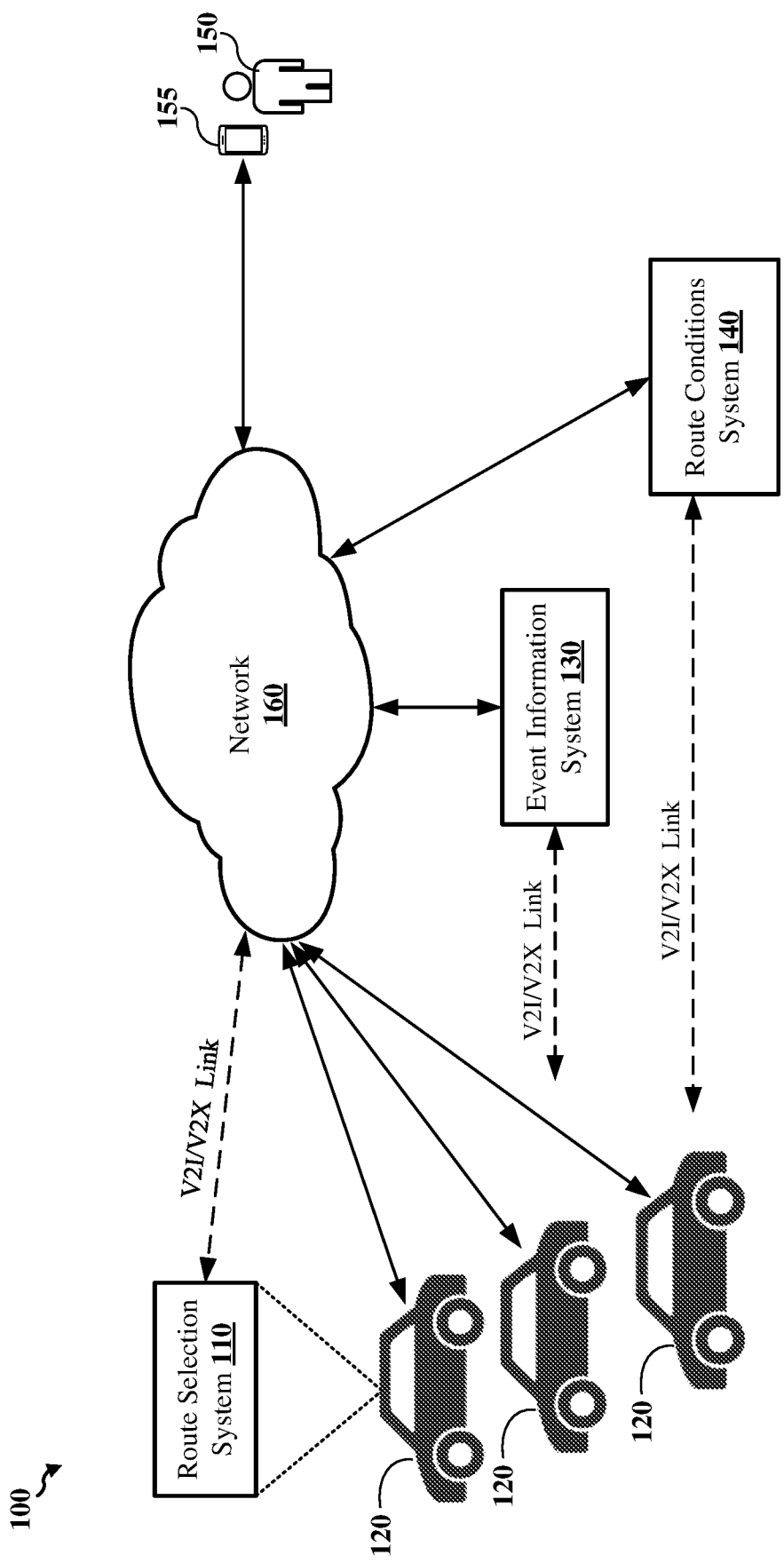
FIG. 1 shows a pictorial diagram of an example environment within which various aspects of the present disclosure can be implemented.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Thus, although described herein with respect to autonomous or semi-autonomous vehicles (also known as self-driving cars or "SDCs"), aspects of the present disclosure may be implemented within other vehicles such as (but not limited to) cars, trucks, motorcycles, buses, boats, helicopters, robots, unmanned aerial vehicles, recreational vehicles, amusement park vehicles, construction equipment, and golf carts.

Vehicles may be configured to operate in an autonomous or semi-autonomous mode and navigate through an environment with little or no input from a driver while in this mode. These autonomous and semi-autonomous vehicles typically include a number of sensors configured to determine information about the environment in which the vehicle operates. The sensors may include one or more light detection and ranging (LIDAR) devices that can detect multiple objects (such as other vehicles, pedestrians, traffic signals, obstacles, and so on) in the environment and determine distances between the autonomous vehicle and the multiple objects. Autonomous and semi-autonomous vehicles may also include other types of sensors such as (but not limited to), sonar devices, radar devices, cameras, and audio sensing devices. Data from the LIDAR and/or other types of sensors can be used to determine various features and characteristics of the detected objects (such as the position, size, shape, type, movement, orientation of the object, etc.).

Some autonomous vehicles can be used or configured for passenger service and/or cargo service (e.g., delivery service). For example, a user may provide a pickup location and/or a drop-off location to a passenger dispatching service, which can relay the passenger pick-up and drop-off locations to an autonomous vehicle. The user may indicate or specify the drop-off and pick-up locations in various ways including (but not limited to), for example, by using the current location of the user's client device, by using a recent or saved location associated with the user's profile, or by entering an address or tapping a location on a map presented on the client device. The client device may send the drop-off and/or pick-up locations to the passenger dispatching service, which in turn can arrange for an autonomous vehicle to pick-up the passenger and transport the passenger to the specified drop-off location.

Unexpected conditions such as traffic jams, hazardous road conditions, sudden weather changes, or car problems may delay the arrival of the autonomous vehicle at the passenger's destination. In some examples, these unexpected conditions (or other unexpected conditions or events) may cause the passenger's estimated time of arrival (ETA) at the destination to be later than a scheduled time for an event at the destination. In some aspects, the passenger may no longer be able to attend or participate in the event at the scheduled time because of delays (e.g., caused by unexpected conditions). For example, if a multi-vehicle accident occurs ahead on the route selected for transporting the passenger to the airport for a flight to Atlanta at a scheduled time, travel delays associated with the accident may prevent the passenger from reaching the airport in time to board the flight to Atlanta at or within a time period before the scheduled time. As a result, the passenger may miss the scheduled flight to Atlanta. In some instances, the passenger may unexpectedly find himself or herself with an additional amount of time to reach the destination (e.g., to catch a later flight to Atlanta departing from the same airport).

In accordance with various aspects of the present disclosure, a vehicle configured for passenger service can use one or more of the techniques disclosed herein to provide a passenger who missed an event at a venue and/or has an unexpected amount of additional time to reach the venue with one or more other routes to the venue based on one or more preferences of the passenger and/or one or more preferences of an operator of the vehicle. In various implementations, a route selection system can obtain a first scheduled time for a first event at a venue for the passenger. The route selection system can determine whether the vehicle will arrive at the venue by the first scheduled time. The route selection system can obtain, in response to a determination that the vehicle will not arrive at the venue by the first scheduled time, a second scheduled time for a second event at the venue. In some implementations, the second event is a later occurrence of the first event (e.g., a later flight to the same destination as an earlier flight corresponding to the first scheduled time, a later showing of the same movie corresponding to the first scheduled time, etc.). In other implementations, the second event may be a later occurrence of the first event (or at least a suitable alternative to the first event) at another venue. For one example, the second event may be a later flight to the same destination as an earlier flight corresponding to a first event at the first scheduled time, and the later flight may depart from a different airport than the earlier flight corresponding to the first event. For another example, the second event may be a later showing of the same movie corresponding to a first event at the first scheduled time, and the later showing of the same movie may be at a different movie theater. The route selection system can determine a route to the venue based on one or more preferences of the passenger, one or more preferences of an operator of the autonomous vehicle, or any combination thereof, where the determined route is config- ured for arrival of the passenger at the venue after the first scheduled time and at or within a time period before the second scheduled time. In this way, when the route selection system determines that a passenger is not going to arrive at a venue in time for an event (and will therefore miss the event), the route selection system can obtain a scheduled time for a later occurrence of the event, and determine one or more alternate routes having longer travel durations to the venue (e.g., since the passenger now has additional time to arrive at the venue). The time period may be of any suitable duration that allows the passenger to exit the autonomous vehicle at a drop-off location at or near the venue and travel (e.g., by walking, jogging, running, taking a train, etc.) from the drop-off location to the event. In some instances, the time period may be defined or predetermined. In other instances, the time period may be provided to the vehicle and/or the route selection system by the passenger. In some other instances, the time period may be determined by the route selection system.

In some aspects, the route may be based on passenger preferences such as (but not limited to) a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, a preference for routes that offset the cost to the passenger, a preference for routes that allow the vehicle to dynamically charge the vehicle, a preference for routes alongside rest areas, or any combination thereof. In addition, or in the alternative, the route may be based on operator preferences such as (but not limited to) a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof.

Several aspects of vehicles that provide passenger and/or cargo services will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a pictorial diagram of an example environment 100 within which various aspects of the subject matter disclosed herein may be implemented. The environment 100 is shown to include a route selection system 110, a number of vehicles 120, an event information system 130, a traffic conditions system 140, a pedestrian 150, a mobile computing device 155, and a communications network 160. Although not shown in FIG. 1 for simplicity, the environment 100 can include other vehicles, people, objects, structures, obstacles, features, and the like (e.g., roads, buildings, bridges, tunnels, traffic signs, and so on).

The route selection system 110 may include any number of computing devices such as (but not limited to) servers that can be implemented in a single location or distributed across multiple locations. The route selection system 110 may include hardware, software, or embedded logic components or a combination of two or more such components for performing the various functions and operations described herein. In some implementations, the route selection system 110 may be housed or hosted independently of the vehicle 120. In some aspects, the route selection system 110 may send commands, instructions, or data to vehicle controllers (not shown in FIG. 1 for simplicity) provided within corresponding vehicles 120. The vehicle controllers may process the received commands, instructions, or data to cause their respective vehicles 120 to perform one or more operations or functions indicated by the route selection system 110. In this way, the route selection system 110 can optimize route selection operations for a plurality of vehicles 120 concurrently.

In some other implementations, the route selection system 110, or an instance of the route selection system 110, may be provided within each of the vehicles 120. In some aspects, the route selection system 110 may interface directly with the vehicle controller of a respective vehicle 120, and may operate independently of route selection systems 110 provided in other vehicles 120. In this way, each route selection system 110 may be associated with a respective vehicle 120.

In some implementations, the route selection systems 110 (or instances thereof) provided within the vehicles 120 may be connected together by a central control system (not shown for simplicity). In some aspects, the central control system may coordinate operations and activities performed by the individual route selection systems 110 and/or their respective vehicles 120. The central control system may also interface with one or more other systems or networks (e.g., the event information system 130, the route conditions system 140, and the network 160).

In various implementations, the route selection system 110 may be used by vehicles 120 transporting passengers to events scheduled for one or more times at various venues or locations. In some implementations, the route selection system 110 may obtain, for a passenger of the vehicle 120, a first scheduled time for a first event at the venue. The route selection system 110 may determine whether the vehicle 120 will arrive at the venue by the first scheduled time. For example, if a passenger of the vehicle 120 has tickets to a 4 pm showing of "John Wick" at a given movie theater, the first scheduled time may be 3:40 pm, which may allow the passenger approximately 20 minutes to exit the vehicle 120 and find an available seat in the movie theater.

In various implementations, the route selection system 110 may determine the initial route to the venue based on the passenger pickup location, the passenger pickup time, the first scheduled time for the first event, the location of the venue, and traffic conditions. The route selection system 110 may determine (e.g., while the vehicle 120 is on route to the venue) that the vehicle 120 will not arrive at the venue by the first scheduled time. For example, an accident along the initial route, a change in weather conditions along a route to the venue, a change in weather conditions at the venue, a change in traffic conditions along the route to the venue, a change in traffic conditions at the venue, a presence of roadway obstructions, or other hazards may delay the arrival of the vehicle 120 at the movie theater until after the 4 pm scheduled time for the John Wick movie. As a result of these delays, the passenger may miss a significant portion (or an entirety) of the 4 pm showing of John Wick.

In some implementations, the route selection system 110 may, in response to determining that the vehicle 120 will not arrive at the venue by the first scheduled time, obtain a second scheduled time for a second event at the venue (e.g., where the second scheduled time is after the first scheduled time). For example, in response to determining that the vehicle 120 will not arrive at the given movie theater by the first scheduled time of 3:40 pm, the route selection system 110 may determine that a second showing of John Wick is scheduled for 6:30 pm at the same movie theater. In some examples, the route selection system 110 may obtain a second scheduled time of 6:10 pm at the movie theater (e.g., thereby allowing the passenger approximately 20 minutes to exit the vehicle 120 and find an available seat in the movie theater). In other examples, the route selection system 110 may allocate other suitable periods of time for the passenger to walk or run from the drop-off location to the movie theater and find an available seat for the later showing of John Wick.

In various implementations, the route selection system 110 may determine a route to the venue based on one or more preferences of the passenger, one or more preferences of an operator of the autonomous vehicle, or any combination thereof. In some aspects, the one or more passenger preferences may include (but are not limited to) a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof. In other aspects, the one or more operator preferences may include a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, or any combination thereof.

The passenger preferences may be provided to or obtained by the route selection system 110 in any suitable manner. For example, in some aspects, the route selection system 110 may retrieve the passenger preferences from a profile of the passenger stored in a network entity (e.g., a server). In other aspects, the route selection system 110 may retrieve the passenger preferences from a mobile computing device associated with the passenger. In some other aspects, the passenger may provide his or her preferences to the route selection system 110 via a user interface provided in the vehicle 120. In some other aspects, the passenger may verbally communicate his or her preferences to the vehicle 120.

In some implementations, the vehicle 120 may present, to the passenger, a plurality of routes configured for the arrival of the passenger at the venue after the first scheduled time for the first event and at or within a time period before the second scheduled time for the second event. In some aspects, the routes may be presented on a display screen viewable by passengers riding in the vehicle 120 (e.g., a display screen within the vehicle 120, a display screen of a mobile computing device 155 associated with the passenger, etc.). A respective passenger may select one of the routes presented on the display screen. The vehicle 120 may determine the route to the venue based on the passenger selection.

The vehicles 120 may be any car, truck, limousine, motorcycle, boat, ferry, helicopter, or other suitable transport suitable for passenger service. In some implementations, the vehicles 120 may include conventional vehicles driven by humans. In some other implementations, the vehicles 120 may include autonomous vehicles capable of navigating through an environment with little or no assistance from a human driver. Although not shown in FIG. 1 for simplicity, the vehicles 120 may include a vehicle controller, one or more communication interfaces, a heads-up display, a user interface, and other components associated with vehicles that can operate in an autonomous or semi-autonomous driving mode.

The venue and event system 130 may include wired or wireless communication interfaces that allow the route selection system 110 to communicate with the venue and event system 130 over the network 160 (e.g., over a Uu interface that links user equipment (UE) to a radio access network). In some aspects, the venue and event system 130 may include a wireless communication interface that allows the route selection system 110 and/or the vehicles 120 to communicate with the venue and event system 130 via one or more direct communication links. The one or more direct communication links may include (but are not limited to) a vehicle-to-infrastructure (V2I) channel, a vehicle-to-everything (V2X) channel, a vehicle-to-network (V2N) channel, a sidelink channel (e.g., a PC5 link), a dedicated short-range communication (DSRC) channel, a Wi-Fi channel, a peer-to-peer (P2P) communications link, an ultra-wideband (UWB) channel, a Bluetooth® Low Energy (BLE) connection, or any other suitable wireless communication link.

In various implementations, the venue and event system 130 may include or represent any number of reservation systems, ticketing systems, and intermediary systems from which events, event times, and event locations can be retrieved or otherwise obtained by the route selection system 110. As used herein, an intermediary system is a system that can communicate with the reservation and/or ticketing systems of a plurality of different companies or entities (e.g., third-party travel booking systems). Example reservation and ticketing systems represented by the event information system 130 may include (but are not limited to) airline reservation systems, train reservation systems, bus reservation systems, concert ticketing systems, movie theaters, guided tour reservation systems, and so on.

The route conditions system 140 may include wired or wireless communication interfaces that allow the route selection system 110 to communicate with the route conditions system 140 over the network 160. In some aspects, the route conditions system 140 may include a wireless communication interface that allows the route selection system 110 and/or the vehicles 120 to communicate with the route conditions system 140 via one or more direct communication links. The one or more direct communication links may include (but are not limited to) a V2I channel, a V2X channel, a V2N channel, a sidelink channel (or PC5 link), a DSRC channel, a Wi-Fi channel, a P2P communications link, a UWB channel, a BLE connection, or any other suitable wireless communication link.

In various implementations, the route conditions system 140 may include or represent any suitable source of real-time traffic information such as (but not limited to) publicly available traffic systems, governmental agencies, subscription-based services, other vehicles 120, pedestrians 150, road-side sensors, and so on. In some implementations, the route conditions system 140 may also include or represent one or more real-time weather services that can provide accurate real-time weather conditions along certain routes, within certain geographic areas, at certain venues or locations, at certain events, and so on. In some examples, the route selection system 110 may use the real-time weather information to increase the accuracy with which the ETAs for one or more routes to a respective venue can be determined.

The pedestrian 150 may be any one or more persons in a position or vantage point from which to capture data (e.g., images, video, and/or audio) indicative of traffic conditions, weather conditions, accidents, roadway obstructions, and other route attributes that may delay the arrival time of the vehicle 120 at a respective venue. In some implementations, the route selection system 110 may combine captured data received from pedestrians 150 with real-time traffic and weather information provided by the route conditions system 140. In some examples, the pedestrian 150 may use the mobile computing device 155 to capture scene data and send the captured scene data to the route selection system 110.

The mobile computing devices 155 may be any suitable device capable of communicating with the route selection system 110 via the network 160. In some aspects, the mobile computing devices 155 may be cellular telephones, smartphones, smartwatches, headsets, or other mobile computing devices. In other aspects, the mobile computing devices 155 may be a laptop computer, a personal digital assistant, a tablet computer, a game console, or an electronic book reader.

The communications network 160 provides communication links between the route selection system 110, the vehicles 120, the event information system 130, the traffic conditions system 140, the pedestrians 150, and the mobile computing devices 155. The network 160 may be any suitable one or more communication networks including, for example, the Internet, a wide area network (WAN), a metropolitan area network (MAN), a wireless local area network (WLAN), a personal area network (PAN), a radio access network (RAN) such as a Fifth Generation (5G) New Radio (NR) system, a wired network, a cable network, a satellite network, or other suitable network. In some implementations, one or more vehicles 120 can communicate with an edge server or other server in a communications network (such as but not limited to an LTE communications network, a 5G NR communications network, a WLAN, a MAN, a WAN, a PAN, a mesh network, or the Internet) to receive mapping information, traffic information, event information, venue information, and so on.

Figure 2:
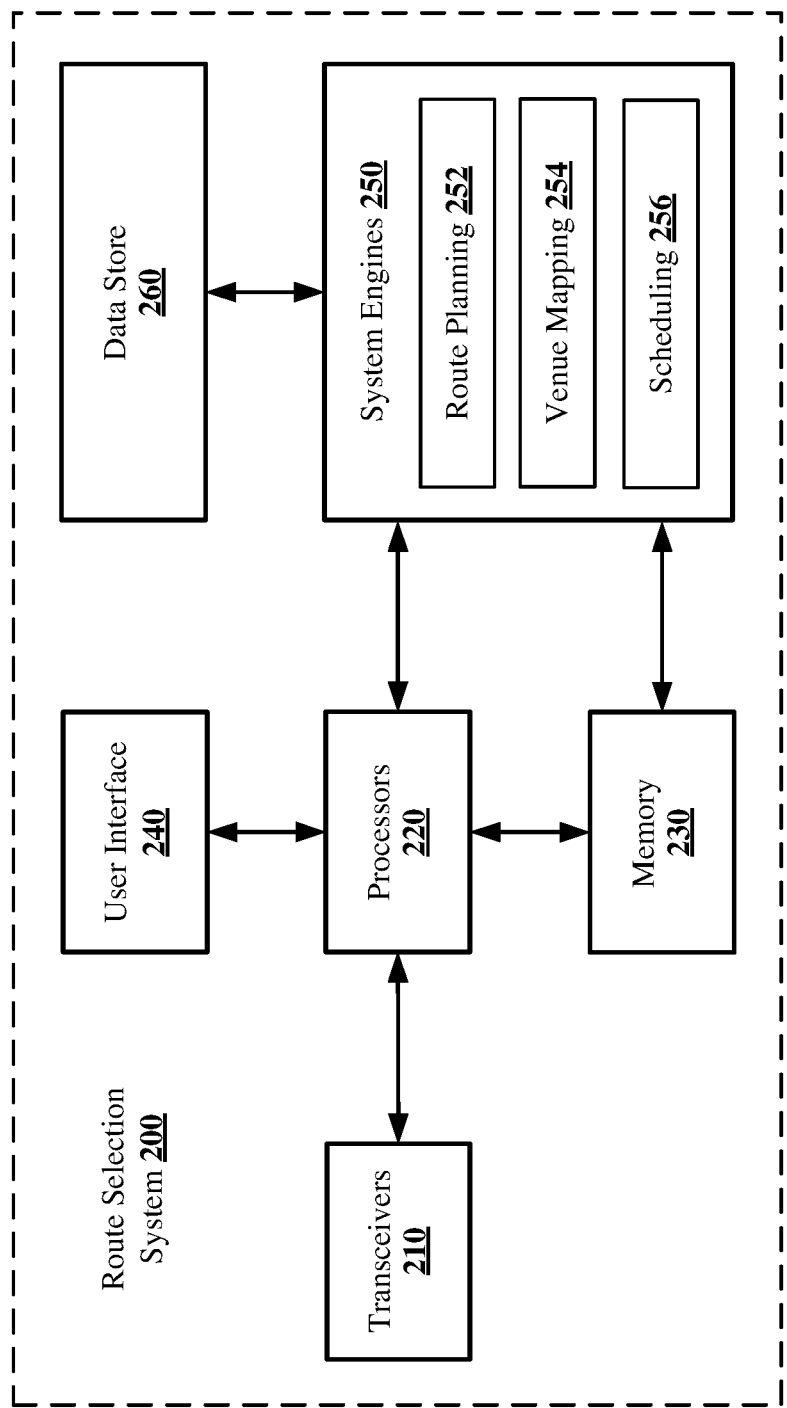
FIG. 2 shows a functional block diagram of the route selection system of FIG. 1, according to some implementations.

FIG. 2 shows a functional block diagram of an example route selection system 200 according to some implementations. The route selection system 200, which may be one example of the route selection system 110 of FIG. 1, is shown to include one or more transceivers 210, one or more processors 220, a memory 230, a user interface 240, system engines 250, and a data store 260. The transceivers 210, which may be coupled to the processors 220, may be used to transmit information to one or more other devices, systems, or entities and to receive information from the one or more other devices, systems, or entities. For example, the transceivers 210 may facilitate the exchange of communications (such as signals and messages) between the route selection system 200, the vehicles 120, the event information system 130, the route conditions system 140, or the pedestrians 50. Although not shown in FIG. 2 for simplicity, the transceivers 210 can include any number of transmit chains to process and transmit signals to other wireless devices via one or more antennas (not shown for simplicity), and can include any number of receive chains to process signals received from the other wireless devices via the one or more antennas. The transceivers 210 may be configured to operate according to one or more suitable wireless communication protocols such as (but not limited to) wireless communications protocols specified by one or more Releases of the Third Generation Partnership Project (3GPP), by one or more amendments to the IEEE 802.11 family of wireless communication standards, the Bluetooth Interest Group, or other suitable communications technology. In addition, or in the alternative, the transceivers 210 may be configured for one or more suitable wired communication protocols including (but not limited to) Ethernet, coaxial, or optical communications.

The processors 220 may be or may include any number of commercially available microprocessors or central processing units (CPUs) capable of executing scripts or instructions of one or more software programs stored in associated memory (such as memory 230). In addition, or in the alternative, the processors 220 may be or may include any number of Application Specific Integrated Circuits (ASICs), Field Programmable Gate Arrays (FPGAs), Programmable Logic Devices (PLDs), Graphics Processing Units (GPUs), Digital Signal Processors (DSPs), Data Processing Units (DPUs), microcontrollers, hardware accelerator(s), or any combination thereof.

The memory 230 may include a non-transitory computer-readable medium (such as one or more nonvolatile memory elements, such as EPROM, EEPROM, Flash memory, a hard drive, etc.) storing instructions that, when executed by the one or more processors 220, cause the route selection system 200 to perform any number of the operations described with reference to FIGS. 6, 7, 8, and 9. The instructions may be any set of instructions to be executed directly (such as machine code) or indirectly (such as scripts) by the processors 220. For example, the instructions may be stored as computing device code on the computing device-readable medium. As such, the terms "instructions" and "programs" may be used interchangeably herein. The instructions may be stored in object code format for direct processing by the processor, or in any other computing device language including scripts or collections of independent source code modules.

The user interface 240 may be coupled to the processors 220 and the memory 230, and can provide a mechanism through which a user can send commands, indications, alerts, and other information to one or more vehicles 120, and through which the user can receive status information, location information, reports, and other information from one or more vehicles 120. In some aspects, the user interface 240 may include a display screen, a keyboard, a mouse, speakers, microphones, and/or other suitable input/output mechanisms.

The system engines 250 may include (but are not limited to) a route planning engine 252, a scheduling engine 256, and a venue mapping engine 254. In various implementations, the route planning engine 252 may determine the initial route for transporting a passenger to a venue at or before a first scheduled time for a first event at the venue. In some implementations, the route planning engine 252 may access or receive detailed map information (such as 3D point clouds) that includes information about roads, bridges, buildings, landmarks, elevations, construction zones, real-time traffic conditions, weather information, event information, and the like from one or more sources such as (but not limited to) governmental institutions, subscription-based services, user-generated map collections, crowdsourced mapping information, mapping information provided by other autonomous vehicles, and so on. In some aspects, the detailed map information can be provided by a network entity or server. In other aspects, the detailed map information (or at least portions thereof) can be provided by one or more of other autonomous vehicles via a suitable wireless channel (such as a V2V channel of a 5G RAN, a sidelink channel of a RAN, an unlicensed frequency band, or a DSRC channel of a wireless network). When the route selection system 200 determines that the vehicle 120 will not arrive at the venue by the first scheduled time, the route planning engine 252 may obtain a second scheduled time for a second event at the venue. The route selection system 200 may determine a route to the venue based on one or more preferences of the passenger, one or more preferences of an operator of the autonomous vehicle, or any combination thereof, wherein the determined route is configured for arrival of the passenger at the venue after the first scheduled time and at or within a time period before the second scheduled time.

As discussed, the passenger preferences may include (but are not limited to) one or more of a preference for scenic routes, a preference for energy-efficient routes, a preference for routes that avoid freeways, a preference for routes that minimize bridge crossings, a preference for routes that enhance passenger safety, a preference for routes that pass one or more points of interest, or a preference for picking up additional passengers along the alternate route. In some aspects, the route planning engine 252 may present one or more routes to the passenger (e.g., on a display screen provided in the vehicle 120, on a display screen of a mobile computing device 155 associated with the passenger, etc.). The route planning engine 252 may receive a selection of one of the presented alternate routes from the passenger. The route planning engine 252 may determine the route to the venue based on the passenger selection.

In various implementations, the venue mapping engine 254 may obtain, receive, or construct mapping information for each of a plurality of venues or locations associated with events frequented or requested by passengers of the vehicle 120. For example, in instances for which the venue is an airport, the mapping information may be indicative of the overall layout, size, and features of the airport's terminals, ticketing counters, baggage claim areas, security lines, trams, subways, concourses, departure gates, and so on.

In various implementations, the scheduling engine 256 may receive event listings, event times, event locations, venue locations, entry points of the venue, and any other suitable information from which the route selection system 200 can determine drop-off times at a venue based on scheduled start times for events at the venue, estimated travel times for passengers to walk or run from a drop-off point of the vehicle 120 to an entry point of the event, or other suitable factors. In some implementations, the scheduling engine 256 may estimate the travel time for a passenger based on one or more of a physical attribute of the passenger, a presence of infants or children with the passenger, an age of the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof. In addition, or in the alternative, the scheduling engine 256 may estimate the travel time based on one or more of wait times for obtaining tickets at the venue, wait times for passing through security lines, delays associated with traveling with one or more pets, a size of the venue, a layout of the venue, entry points of the venue, a level of activity at the venue, or any combination thereof. In some other implementations, the scheduling engine 256 may determine the estimated travel time for a passenger based on one or more of a willingness of the passenger to run from the exit point of the vehicle to the entry point of the second event, a priority level of the passenger's admission to the second event, changes in wait times to enter the second event, a change in location of the second event, or any combination thereof.

In some examples, the venue may be an airport, the first event may be a first airline flight to a destination, and the second event may be a second airline flight to the destination, where the second airline flight has a later departure time than the first airline flight. In various implementations, the scheduling engine 256 may retrieve a flight number of the first airline flight, an airline company associated with the first airline flight, a departure time of the first airline flight, a departure gate of the first airline flight, a flight number of the second airline flight, an airline company associated with the second airline flight, a departure time of the second airline flight, a departure gate of the second airline flight, or any combination thereof. In some implementations, the scheduling engine 256 may receive or determine wait times for checking baggage at the airport, wait times for obtaining a ticket or boarding pass for the second airline flight, wait times for passing through security at the airport, delays associated with traveling with one or more pets, wait times for food service at the airport, a level of activity at the airport, or any combination thereof. In addition, or in the alternative, the scheduling engine 256 may receive or determine a security pre-screening status of the passenger, a pre-boarding status of the passenger, a preferred traveler status of the passenger, or any combination thereof. In various implementations, the route selection system 200 may determine the estimated travel time based on one or more of the determinations.

In some other examples, the venue may be a movie theater complex, the first event may be a first showing of a movie at a first scheduled time, and the second event may be a second showing of the movie at a second scheduled time that is after the first scheduled time. In various implementations, the scheduling engine 256 may receive or obtain one or more second showtimes of the movie at the movie theater complex in response to a determination that the vehicle 120 will not arrive at the movie theater complex by the first scheduled time. The scheduling engine 256 may select one of the second showtimes of the movie for the passenger, or may present the second showtimes of the movie to the passenger (e.g., on a display screen provided in the vehicle 120, on a display screen of a mobile computing device 155 associated with the passenger, etc.). The scheduling engine 256 may receive a passenger selection of one of the presented second showtimes. In some implementations, the scheduling engine 256 may receive or determine wait times for obtaining a ticket to the second showing of the movie, wait times for food service at the movie theater, a level of activity at the movie theater, or any combination thereof. In various implementations, the route selection system 200 may determine the estimated travel time based on one or more of the determinations.

The data store 260 may include route data, navigation data, event data, venue data, and user profile data. The route data may include route information for rides requested by the passengers, road conditions, traffic conditions, weather conditions, construction activity, and any other information associated with using the additional time to take a longer alternate route that appeals to one or more passenger preferences and/or one or more vehicle operator preferences. The navigation data may include map data and/or sensor data such as street views of particular areas, satellite views of particular areas, and the like.

The event data may include listings of nearby events, scheduled times for the events, venue locations for the event, ticket availability for the events, and any other suitable information useful for selecting an event for a passenger and/or useful for selecting a later occurrence of an event for the passenger. In various implementations, the event data may also include real-time flight information (e.g., flight numbers, departure times, departure gates, etc.), real-time movie information (e.g., movie listings, movie showtimes, movie theater locations, etc.), and/or real-time information for other events.

The venue data may include a listing of venues, venue locations, entry points of the venue, venue layouts, venue sizes, and so on. For example, the venue data for an airport may include (but is not limited to) a location, a size, and a layout of the airport. In various implementations, the venue data of an airport may also include real-time information indicative of one or more of wait times for checking baggage, wait times at the ticketing counters, wait times for passing through security, wait times for food service, policy activity at the airport, and so on. For another example, the venue data for a movie theater may include (but is not limited to) a location, a size, and a layout of the movie theater. In various implementations, the venue data of a movie theater may also include real-time information indicative of wait times for obtaining movie tickets, wait times for popcorn, wait times for the restroom, and so on.

The user profile data may include profile information for any number of past, current, or expected passengers of a vehicle. The profile information for a respective passenger may include the passenger's identification information (such as name, age, height, and so on), passenger route preferences, passenger travel preferences, and passenger priority information. In some implementations, the profile information may also indicate a willingness of the passenger to run from a drop-off point of the vehicle 120 to an entry point of an event (e.g., so that the passenger arrives at the event at the scheduled time). In some examples, the profile information may be received from a profile of the passenger stored in a network entity (e.g., a server). In other examples, the profile information may be received from a mobile computing device associated with the passenger. In some other examples, the profile information may be received from one or more of the vehicles 120 configured for passenger service.

The passenger route preferences may include (but are not limited to) a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof. The passenger travel preferences may include (but are not limited to) whether the passenger typically travels with an infant or small child, an amount of luggage typically carried by the passenger, and so on. The passenger priority information may include (but is not limited to) a preferred event status of the passenger, a preferred traveler status of the passenger, a pre-screened security clearance of the passenger, and so on.

Figure 3:
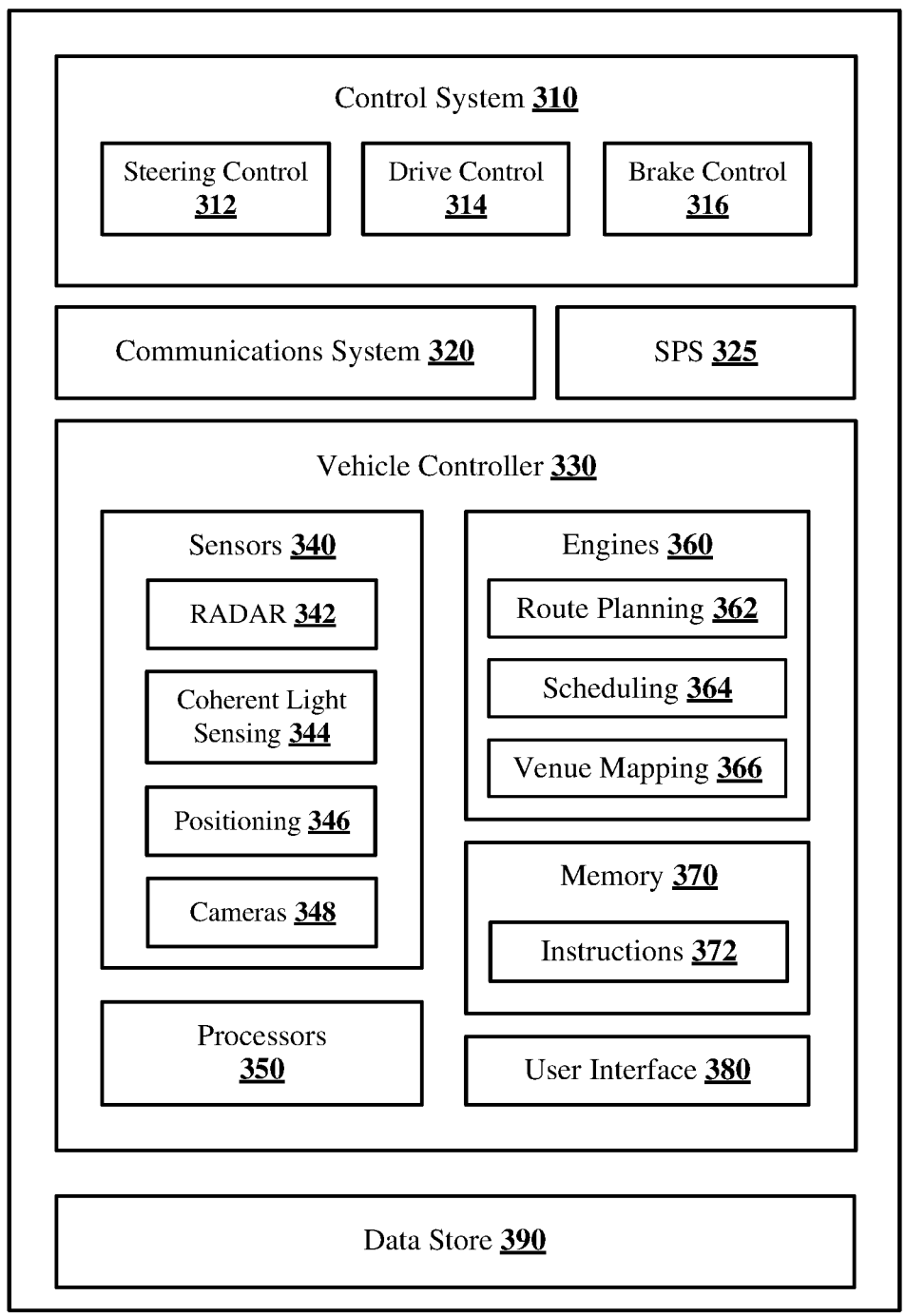
FIG. 3 shows a block diagram of an example autonomous vehicle, according to some implementations.

FIG. 3 shows a block diagram of an example autonomous vehicle 300, according to some implementations. The autonomous vehicle 300, which may be one example of one or more of the vehicles 120 of FIG. 1, is shown to include a control system 310, a communications system 320, a satellite positioning system (SPS) unit 325, a vehicle controller 330, and data store 390. Other components of the autonomous vehicle 300 are not shown for simplicity. The autonomous vehicle 300 may be implemented as any number of different types of vehicles, including vehicles capable of transporting people and/or cargo, and capable of traveling in various environments, and it will be appreciated that the aforementioned components can vary widely based upon the type of vehicle within which these components are utilized.

The control system 310 may include a steering control 312, a drive control 314, and a brake control 316. The steering control 312 may include one or more actuators and/or sensors for controlling and receiving feedback from the direction or steering components to enable the autonomous vehicle 300 to follow a desired trajectory (e.g., by navigating along a route in a manner that avoids obstacles and hazards while obeying traffic laws and traffic signs). The drive control 314 may be configured to control a powertrain of the autonomous vehicle 300. The brake control 316 may be configured to control one or more brakes that slow or stop the vehicle 300.

The communications system 320 may be used to establish and maintain communications links between the autonomous vehicle 300 and the route selection system 110, one or more associated vehicle controllers, and one or more mobile computing devices 155. The communications system 320 may use any suitable communications protocol including, for example, wireless communications protocols specified by one or more Releases of the 3GPP, by one or more amendments to the IEEE 802.11 family of wireless communication standards, the Bluetooth Interest Group, or other suitable communications technology.

The SPS unit 325 may receive and decode satellite signals associated with various global satellite services such as the Global Positioning System (GPS), the Global Navigation Satellite System (GLONASS), and Galileo, as well as various regional satellite services such as the Indian Regional Navigation Satellite System (IRNSS). The satellite signals can be used by the autonomous vehicle for general positioning, navigation, and mapping purposes.

The vehicle controller 330, which may be implemented using any analog, digital, or mixed signal processing circuitry to control various operations of the autonomous vehicle 300, is shown to include sensors 340, processors 350, system engines 360, a memory 370, and a user interface 380. The vehicle controller 330 may interface with the autonomous vehicle's control system 310, and may be used to control various operations of the autonomous vehicle 300 including (but not limited to) assuming control of the autonomous vehicle 300, providing instructions to the autonomous vehicle 300, configuring the autonomous vehicle 300 for passenger service, disabling the autonomous vehicle 300, restricting one or more operations of the autonomous vehicle 300, and limiting one or more driving metrics of the autonomous vehicle 300.

The sensors 340 may include any suitable sensors or devices that can be used, individually or in conjunction with one another, to scan a surrounding environment for objects, other vehicles, roads, road conditions, traffic signs, traffic lights, weather conditions, environmental features, buildings, hazardous conditions, and other features of the surrounding environment. In some implementations, the sensors 340 may include a RADAR system 342, a coherent light sensing system 344, positioning sensors 346, cameras 348, and other suitable sensing devices.

In various implementations, the RADAR system 342 and the coherent light sensing system 344 may be used to detect a presence of objects in the surrounding environment and/or to determine distances between the objects and the autonomous vehicle 300. The RADAR system 342 and the coherent light sensing system 344 may be used to determine movement of the detected objects relative to the autonomous vehicle 300. The RADAR system 342 and the coherent light sensing system 344 may be used to determine other features and attributes of a surrounding environment. The RADAR system 342 can include one or more radio frequency (RF) sensors and one or more millimeter wave (mmW) frequency sensors. The coherent light sensing system 344 can include one or more LIDAR sensors and one or more infrared (IR) sensors.

In some implementations, measurements provided by the RF sensors, mmW frequency sensors, SONAR sensors, LIDAR sensors, and/or IR sensors can be used by a neural network to detect and classify objects in the surrounding environment. For example, in some aspects, the neural network may employ deep learning and inference techniques to recognize the detected objects (e.g., to recognize that a first detected object is another vehicle, a second detected object is a stop sign, a third detected object is a pedestrian, and so on).

In various implementations, the coherent light sensing system 344 can emit light or infrared (IR) pulses into an environment and receive light or IR pulses reflected by objects and other surfaces in the environment to determine information about the objects and the other surfaces. In some aspects, the distance to a detected object may be determined based on a time between emission of a light or IR pulse by the coherent light sensing system 344 and reception of a corresponding reflected light or IR pulse by the coherent light sensing system 344. The size, shape, orientation, texture, and other features of the detected object may be determined based (at least in part) on the amplitudes, pulse widths, timing information, and other characteristics of a multitude of such received light or IR pulses. Information generated from the received light or IR pulses may be used to generate a point cloud indicating the location, size, shape, movement, orientation, and other features of objects and other surfaces detected in the environment. The measured distances can be combined with orientations of the emitters to associate a 3D position with each light or IR pulse received by the coherent light sensing system 344. The 3D positions associated with a plurality of received light or IR pulses may be used to generate a 3D map of points indicative of locations of various objects and features in the environment. The autonomous vehicle 300 can use one or more of these 3D point clouds to navigate through the environment (such as along a route between drop-off or pickup locations) without human input.

The positioning sensors 346 can be used to determine the location of the vehicle 300 on the Earth using SPS, cellular, Wi-Fi, or other suitable positioning signals. The cameras 348 may be or may include a camera, a video recorder, image sensor, or any other suitable device or component capable of capturing images, video, and/or audio of at least a portion of the surrounding environment.

In various implementations, the system engines 360 may include a route planning engine 362, a scheduling engine 364, and a venue mapping engine 366. In some implementations, the route planning engine 362 may be one example of the route planning engine 252 of FIG. 2. For example, the route planning engine 362 may access or receive detailed map information (such as 3D point clouds) that includes information about roads, bridges, buildings, landmarks, elevations, construction zones, and the like. The route planning engine 362 can also receive real-time information such as (but not limited to) traffic conditions, weather information, event information, event start times, event venue locations, entry points of the venue, and so on. In various implementations, the route planning engine 362 may use the detailed map information and the received real-time information to determine an initial route for transporting a passenger to a venue at or before a scheduled time for an event at the venue. In some implementations, the route planning engine 362 may use the detailed map information and the received real-time information to determine whether or not the vehicle 300 will arrive at the venue at or before a first drop-off time determined for the event. The route planning engine 362 may also use the detailed map information and the received real-time information to identify one or more alternate routes for transporting the passenger to the venue at or within a time period before a second drop-off time determined for a later occurrence or instance of the event at the venue. The time period may be of any suitable duration that allows the passenger to exit the autonomous vehicle at a drop-off location at or near the venue and travel (e.g., by walking, jogging, running, taking a train, etc.) from the drop-off location to the event. In some instances, the time period may be defined or predetermined. In other instances, the time period may be provided by the passenger. In some other instances, the time period may be determined by the route selection system.

In some implementations, the scheduling engine 364 may be one example of the scheduling engine 256 of FIG. 2. For example, the scheduling engine 364 may receive event listings, event times, event locations, venue locations, entry points of the venue, and any other suitable information from which the vehicle 300 can determine drop-off times at a venue based on scheduled start times for events at the venue, estimated travel times for passengers to walk or run from a drop-off point of the vehicle 300 to an entry point of the event, and/or other suitable factors. In some implementations, the scheduling engine 364 may estimate the passenger travel time based on one or more factors including (but not limited to) a physical attribute of the passenger, a presence of infants or children with the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof. In some implementations, the scheduling engine 364 may determine the estimated passenger travel time based on the determined wait times, a willingness of the passenger to run from the exit point of the vehicle 300 to the entry point of the second event, a priority level of the passenger's admission to the second event, changes in wait times to enter the second event, a change in location of the second event, or any combination thereof.

In some implementations, the venue mapping engine 366 may be one example of the venue mapping engine 254 of FIG. 2. For example, the venue mapping engine 366 may obtain, receive, or construct mapping information for each of a plurality of venues or locations associated with events frequented or requested by passengers of the vehicle 300. For example, in instances for which the venue is an airport, the mapping information may be indicative of the overall layout, size, and features of the airport's terminals, ticketing counters, baggage claim areas, security lines, trams, subways, concourses, departure gates, entry points, exit points, and so on.

In some implementations, the navigation system 360 may include a localization subsystem 362 and a perception subsystem 364. The localization subsystem 364 may be used for determining the location and orientation of the vehicle 300 within its surrounding environment, and generally within some frame of reference. The perception subsystem 364 may be used for detecting, tracking, and/or identifying objects within the environment surrounding the vehicle 300. The navigation system 360 may use results data generated by the localization subsystem 362 and the perception subsystem 364 to predict a trajectory for the vehicle 300 over a given time period and/or to a particular destination.

The user interface 380 may be or may include any suitable devices or components through which the autonomous vehicle 300 can present questions, options, or other information to an operator or a passenger of the vehicle 300, and/or through which the operator or passenger may provide answers or other responsive information to the vehicle 300. In some examples, the user interface 380 may include tablet computers, touch-sensitive displays, speakers, microphones, and the like. In other implementations, a passenger or operator may exchange communications with the vehicle 300 using an app residing on a computing device (such as the mobile computing devices 155) or using a web browser.

The data store 390 may store navigation information, weather information, user profiles, and other information pertaining to the vehicle 300, the surrounding environment, and/or passengers of the vehicle 300. For example, the navigation data may include route information for rides requested by passengers, road conditions, traffic information, weather conditions, construction activity, and other suitable information useful for determining one or more routes for transporting a passenger to a venue at or within a time period before a scheduled time for an event at the venue. In some aspects, the navigation data may include map data and/or sensor data such as street views of particular areas, satellite views of particular areas, and the like.

Figure 4:
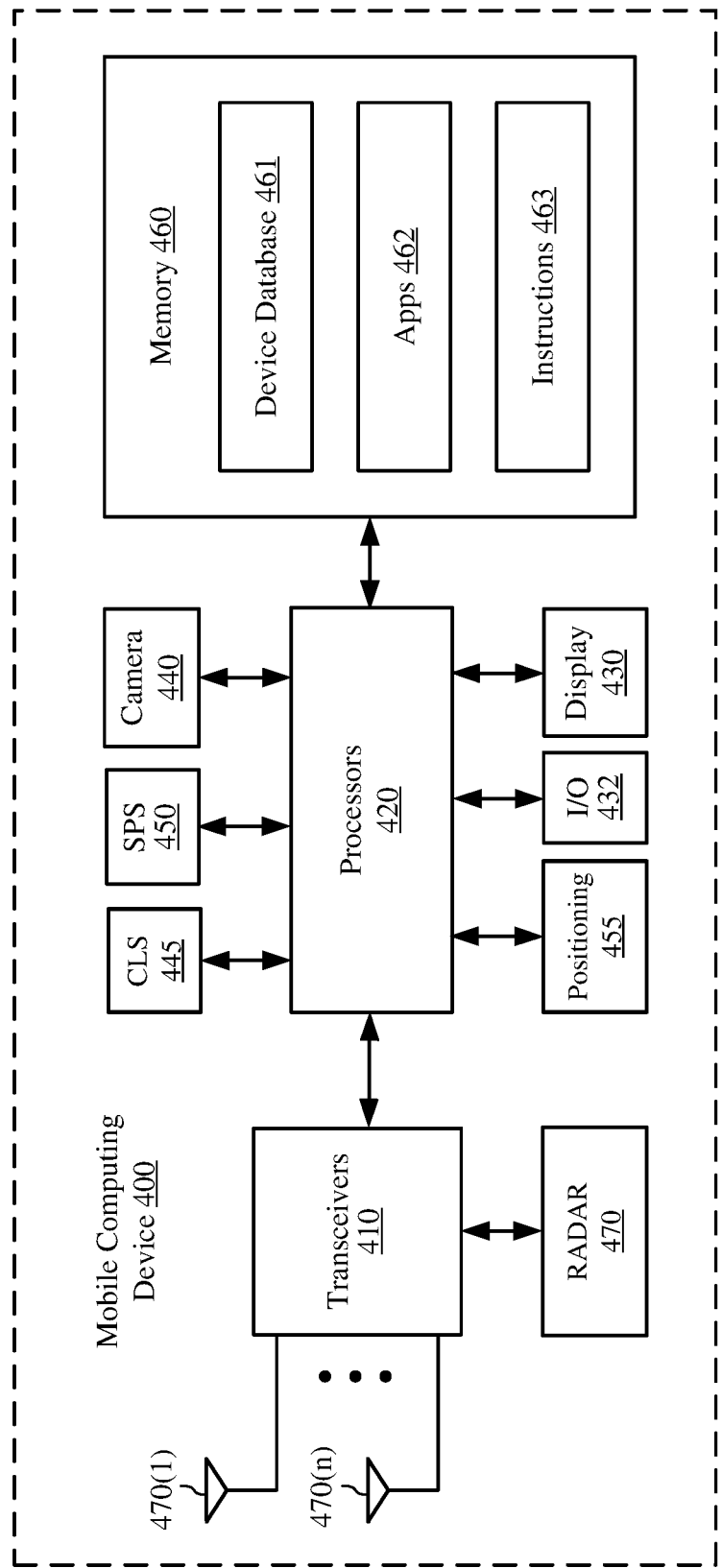
FIG. 4 shows a block diagram of an example mobile computing device, according to some implementations.

FIG. 4 shows a block diagram of an example mobile computing device 400, according to some implementations. The mobile computing device 400, which may be one example of the mobile computing device 155 of FIG. 1, can include transceivers 410, one or more processors 420, a display 430, 110 components 432, a camera 440, an SPS unit 450, a memory 460, and a number of antennas 470(1)-470 (n). The transceivers 410 may be coupled to the antennas 470(1)-470(n), either directly or through an antenna selection circuit (not shown for simplicity), and can be used to transmit signals to and receive signals from other devices. In some aspects, the transceivers 410 can facilitate wireless communications between the mobile computing device 400 and the route selection system 200 of FIG. 2. Although not shown in FIG. 4 for simplicity, the transceivers 410 can include any number of transmit chains to process and transmit signals to other wireless devices via the antennas 470(1)-470(n), and can include any number of receive chains to process signals received from the antennas 470 (1)-470(n). A baseband processor (not shown for simplicity) can be used to process signals received from the processors 420 or the memory 460 (or both) and to forward the processed signals to the transceivers 410 for transmission via one or more of the antennas 470(1)-470(n), and can be used to process signals received from one or more of the antennas 470(1)-470(n) via the transceivers 410 and to forward the processed signals to the processors 420 or the memory 460 (or both).

The processors 420 can be any suitable one or more processors capable of executing scripts or instructions of one or more software programs stored in the mobile computing device 400 (such as within the memory 460). In some implementations, the processors 420 can be or include one or more microprocessors providing processor functionality and include external memory providing at least a portion of machine-readable media. In other implementations, the processors 420 can be or include an Application Specific Integrated Circuit (ASIC) with the processor, the bus interface, the customer interface, and at least a portion of the machine-readable media integrated into a single chip. In some other implementations, the processors 420 can be or include one or more Field Programmable Gate Arrays (FPGAs) or Programmable Logic Devices (PLDs).

The display 430 can be any suitable display or screen upon which information can be presented to a user. In some aspects, the display 430 can be a touch-sensitive display that allows the user to control, interact with, or initiate a number of functions and operations of the mobile computing device 400. The I/O components 432 can be or include any suitable mechanism, interface, or device to receive input (such as commands) from the user and to provide output to the user. For example, the I/O components 432 may include (but are not limited to) a graphical customer interface, keyboard, mouse, microphone, speakers, and so on. In some aspects, the I/O components 432 can work in conjunction with the display 430. In some other aspects, the I/O components 432 can include, or can be part of, the display 430.

The camera 440 may be or may include a camera, a video recorder, or any other suitable device or component capable of capturing images, video, and/or audio of a scene. For example, a user of the mobile computing device 400 may use the camera 440 to capture images, video, and/or audio of traffic conditions, accidents, roadway obstructions, and other scenes that can used by the vehicle 120 to select a route most suitable for a given passenger. In some aspects, the captured images, video, and/or audio can be transmitted to the route selection system 110 via the communications network 160. In some other aspects, the captured images, video, and/or audio can be transmitted to the vehicle 120 via the communications network 160 of FIG. 1.

The SPS unit 450 may receive and decode satellite signals associated with various global satellite services such as GPS, GLONASS, and Galileo, as well as various regional satellite services such as the IRNSS. The satellite signals can be used by the mobile computing device 400 for general positioning and navigation purposes.

The memory 460 can include a device database 461 that stores profile information for the mobile computing device 400. The device database 461 can also store information associated with the route selection system 200 of FIG. 2. The memory 460 can also store a number of mobile apps 462. In some aspects, at least one of the mobile apps 462 may be a mobile app associated with the route selection system 200 of FIG. 2. For example, the mobile app may be used to interface with and send captured images, video, or audio of road conditions, traffic conditions, weather conditions, and the like to the route selection system 200. In various implementations, the memory 460 may also include a non-transitory computer-readable medium (such as one or more nonvolatile memory elements, such as EPROM, EEPROM, Flash memory, a hard drive, and so on) that may store computer-executable instructions 463 that, when executed by the processors 420, cause the mobile computing device 400 to perform one or more corresponding operations.

In some implementations, the mobile computing device 400 may also include a coherent light sensing (CLS) system 445, positioning sensors 455, a RADAR system 470, and other suitable sensing devices (not shown for simplicity). In various implementations, the RADAR system 470 and the CLS system 445 may be used to detect a presence of objects in the surrounding environment and/or to determine distances between the objects and the mobile computing device 400. The RADAR system 470 and the CLS system 445 may be used to determine movement of the detected objects relative to the mobile computing device 400, to determine other features and attributes of a surrounding environment, or both (e.g., in a manner similar to that described above with reference to the RADAR system 342 and the CLS system 344 of FIG. 3). In some instances, the RADAR system 470 can include one or more RF sensors and one or more mmW frequency sensors. In some aspects, the CLS system 445 can include one or more LIDAR sensors and one or more infrared (IR) sensors. The positioning sensors 455 can be used to determine the location of the mobile computing device 400 on Earth using SPS, cellular, Wi-Fi, or other suitable positioning signals (e.g., in a manner similar to that described above with reference to the positioning sensors 346 of FIG. 3).

Figure 5:
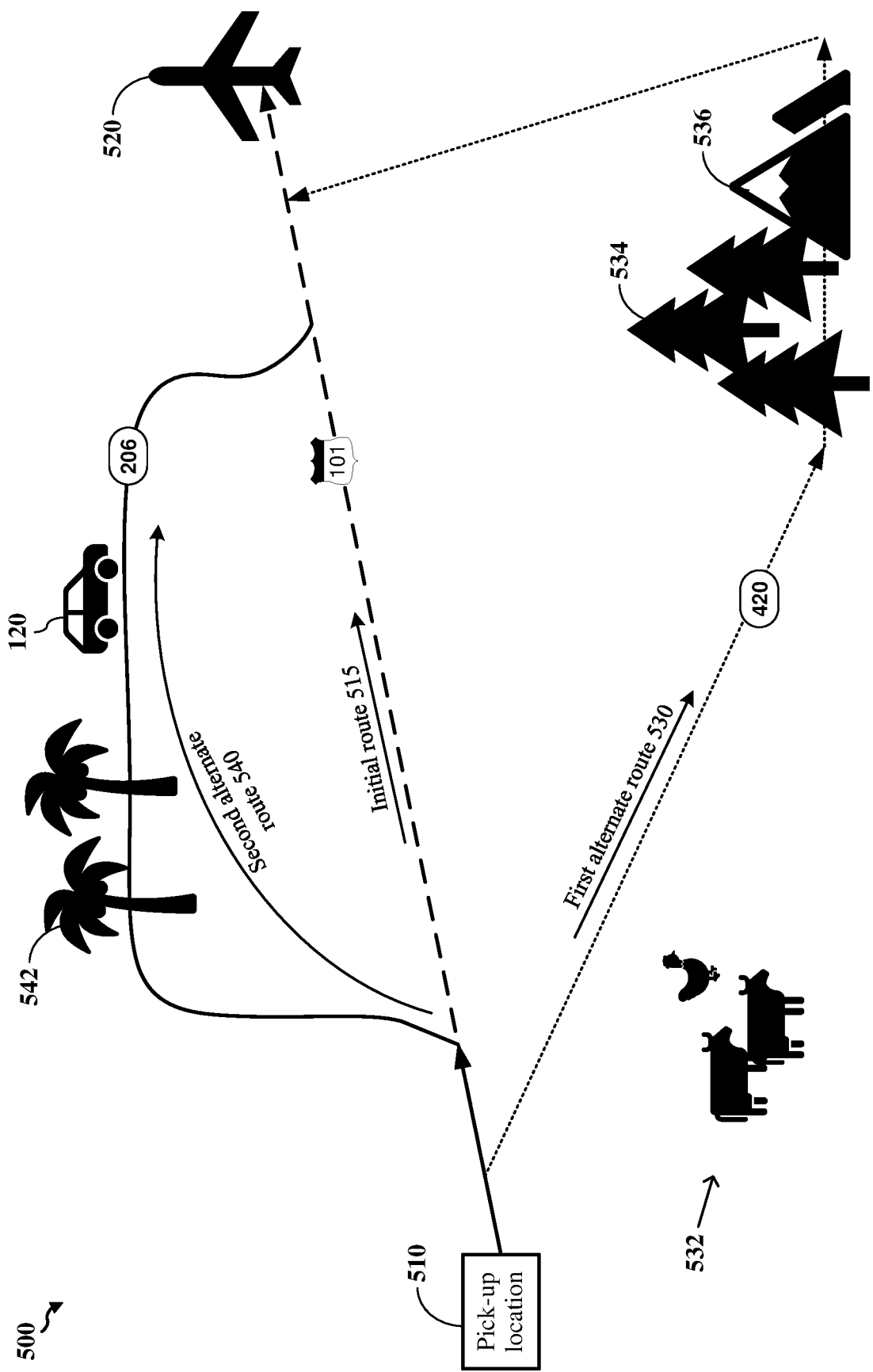
FIG. 5 shows an illustration depicting a vehicle selecting an alternate route for a passenger, according to some implementations.

FIG. 5 shows an illustration 500 depicting an example operation for selecting an alternate route for a passenger, according to some implementations. As discussed, the route selection system 200 may schedule, for a passenger of a vehicle 120, a first drop-off time at a location based on a scheduled time for a first event at the location. For the example of FIG. 5, a passenger confirmed for a first flight from San Francisco to Atlanta requests transportation from a pick-up location 510 to San Francisco airport 520. The route selection system 200 may obtain a first scheduled time for a first flight departing from San Francisco airport 520 for Atlanta. In some instances, the route selection system 200 may determine an initial route 515 to transport the passenger to San Francisco airport 520 at or within a first time period before the first scheduled time. In some examples, the route selection system 200 may determine the initial route 515 to San Francisco airport 520 based on the passenger pick-up location 510, the passenger pick-up time, the first scheduled time, and the travel times of one or more routes between the pick-up location 510 and San Francisco airport 520.

For example, if the first flight from San Francisco to Atlanta departs at 4 pm, the route selection system 200 may select a 2:30 pm drop-off time at the San Francisco airport 520 (e.g., thereby allowing the passenger a time period of approximately 1.5 hours to get from an exit point of the vehicle to the departure gate at or before the 4 pm departure time of the first flight). In other examples, the route selection system 200 may allocate other periods of time for the passenger to travel from the exit point of the vehicle to the departure gate of the first flight.

As the vehicle 120 travels along the route 515 towards San Francisco airport 520, there may be unexpected traffic jams, accidents, road obstructions, or car problems that can delay the arrival of the vehicle 120 at San Francisco airport 520. For the example of FIG. 5, the route selection system 200 determines that the vehicle 120 will not arrive at San Francisco airport 520 at or before the first scheduled time. In response to determining that the vehicle 120 will not arrive at the San Francisco airport 520 by the first scheduled time, the route selection system 200 obtains a second scheduled time for a second flight departing from San Francisco for Atlanta (e.g., where the scheduled time for the second flight is after the scheduled time for the first flight). In some instances, the second flight from San Francisco to Atlanta may have the same flight attributes as the first flight from San Francisco to Atlanta (e.g., the same airline, the same departure airport, the same arrival airport, the same number of layovers, the same layover locations, the same type of airplane, the same class of service, or any combination thereof). In other instances, the second flight from San Francisco to Atlanta may have one or more different flight attributes than the first flight from San Francisco to Atlanta. For example, the second flight may be on a different airline than the first flight, may depart from a different airport than the first flight, may arrive at a different airport than the first flight, may have a different number of layovers than the first flight, may have different layover locations than the first flight, or any combination thereof.

For the example of FIG. 5, the route selection system 200 obtains a second flight from San Francisco to Atlanta that departs from San Francisco airport 520 at 9 pm. In some examples, the route selection system 200 may schedule a second drop-off time at San Francisco airport 520 for 8:30 pm (e.g., thereby allowing the passenger a time period of approximately 1.5 hours to get from the vehicle drop-off point to the departure gate of the second flight at or before the 9 pm departure time of the second flight). In other examples, the route selection system 200 may allocate other periods of time for the passenger to travel from the vehicle drop-off point to the departure gate of the second flight. In some examples, the route selection system 200 may book the passenger on the second flight from San Francisco to Atlanta. In other examples, the route selection system 200 may book the passenger on another flight to Atlanta that departs from another airport (e.g., from Oakland or San Jose) within a certain distance or travel time of the San Francisco airport.

For the example of FIG. 5, the route selection system 200 determines two alternate routes for transporting the passenger to San Francisco airport 520 at or before the second scheduled time. The first alternate route 530 lies east of the initial route 515, passes through scenic farmland 532, pristine forests 534, and majestic mountains 536. The route selection system 200 estimates that the first alternate route 530 has a travel time of 3.5 hours, and would result in an arrival time of approximately 8:15 pm at San Francisco airport 520. The second alternate route 540 lies west of the initial route 515, and passes along pristine beaches and coastline 542. The route selection system 200 estimates that the second alternate route 540 has a travel time of 2.5 hours, and would result in an arrival time of approximately 7:15 pm at San Francisco airport 520. For the example of FIG. 5, the second alternate route 540 is selected for transporting the passenger to San Francisco airport 520 after the first scheduled time and at or within the time period before the second scheduled time.

Figure 6:
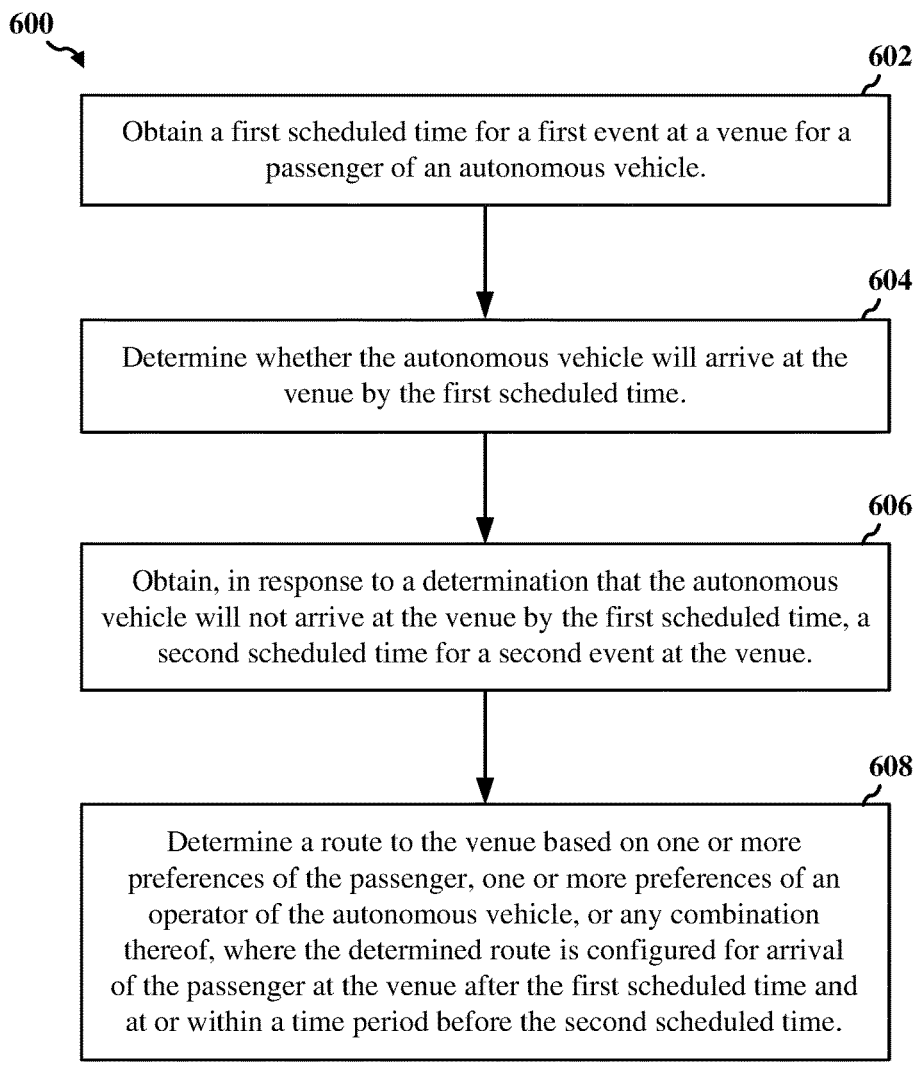
FIG. 6 shows a flow chart depicting an example operation for determining routes for a vehicle, according to some implementations.

FIG. 6 shows a flow chart depicting an example operation 600 for determining routes for a vehicle, according to some implementations. In various implementations, the operation 600 may be performed by the route selection system 200 of FIG. 300. For example, at block 602, the route selection system may obtain a first scheduled time for a first event at a venue for a passenger. At block 604, the route selection system may determine whether the autonomous vehicle will arrive at the venue by the first scheduled time. At block 606, the route selection system may obtain, in response to a determination that the autonomous vehicle will not arrive at the venue by the first scheduled time, a second scheduled time for a second event at the venue. In various implementations, the second event may be a later occurrence of the first event.

In some implementations, the one or more passenger preferences may include a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof. In some examples, the one or more passenger preferences may be received from a profile of the passenger stored in a network entity, a mobile computing device associated with the passenger, a user interface of the autonomous vehicle, a verbal indication by the passenger, or any combination thereof.

In some implementations, the one or more operator preferences may include a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, or any combination thereof. In some instances, the operator may be associated with a crowdsourcing application, and the one or more operator preferences may include a preference for routes associated with a greatest amount of revenue attributed to services provided by the vehicle.

In various implementations, the second scheduled time may be based on an estimated travel time of the passenger from a vehicle drop-off point to an entry point of the second event. In some implementations, the estimated travel time may be based at least in part on a physical attribute of the passenger, an age of the passenger, a presence of infants or children with the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof. In some other implementations, the estimated travel time may be based at least in part on wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof.

In some examples for which the venue is an airport, the estimated travel time may be based on wait times for checking baggage at the airport, wait times for obtaining a ticket or a boarding pass for the second flight, wait times for clearing security at the airport, delays associated with traveling with one or more pets, wait times for food service at the airport, a size of the airport, a layout of the airport, entry points of the airport, a level of activity at the airport, a level of the passenger's familiarity with the airport, a security pre-screening status of the passenger, a pre-boarding status of the passenger, an absence of carry-on luggage of the passenger, a preferred traveler status of the passenger, or any combination thereof.

In other examples for which the venue is a movie theater, the estimated travel time may be based on wait times for purchasing tickets at the movie theater, wait times for passing through security at the movie theater, wait times for popcorn at the movie theater, a size of the movie theater, a layout of the movie theater, entry points of the movie theater, a level of activity at the movie theater, a level of the passenger's familiarity with the movie theater, or any combination thereof.

Figure 7:
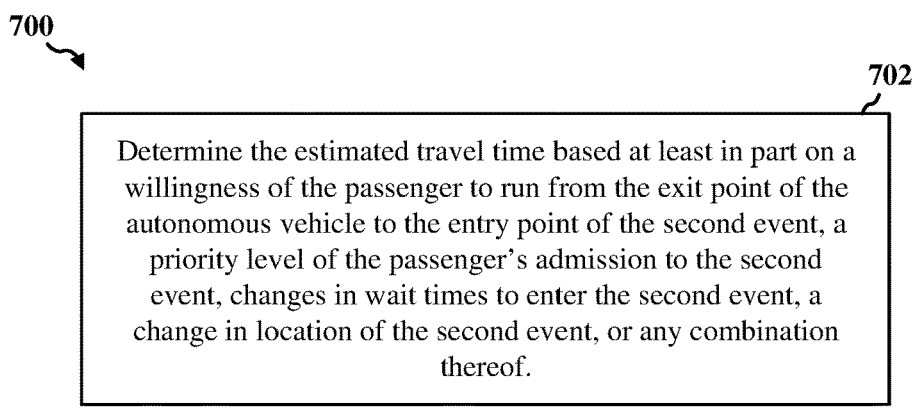
FIG. 7 shows a flow chart depicting an example operation for determining the estimated travel time of a passenger, according to some implementations.

FIG. 7 shows a flowchart depicting an example operation 700 for determining an estimated travel time of a passenger, according to some implementations. In various implementations, the operation 700 may be performed by the route selection system 200 of FIG. 2. In some implementations, the operation 700 may be performed in conjunction with obtaining the second scheduled time in block 606 of FIG. 6. For example, at block 702, the route selection system may determine the estimated travel time based at least in part on a willingness of the passenger to run from the exit point of the autonomous vehicle to the entry point of the second event, a priority level of the passenger's admission to the second event, changes in wait times to enter the second event, a change in location of the second event, or any combination thereof. That is, in some instances, the estimated travel time may also be based on the passenger's willingness.

Figure 8:
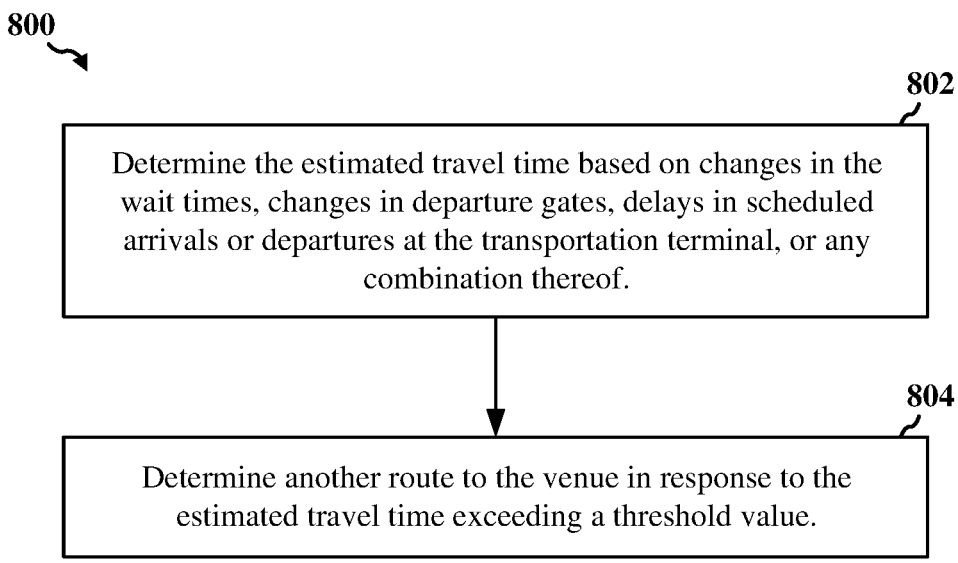
FIG. 8 shows a flow chart depicting an example operation for determining the estimated travel time of a passenger, according to some other implementations.

FIG. 8 shows a flowchart depicting an example operation 800 for determining an estimated travel time of a passenger, according to other implementations. In various implementations, the operation 800 may be performed by the route selection system 200 of FIG. 2. In some implementations, the operation 800 may be performed in conjunction with obtaining the second scheduled time in block 606 of FIG. 6 when the venue is a transportation terminal. For example, at block 802, the route selection system may determine the estimated travel time based on changes in the wait times, changes in departure gates, delays in scheduled arrivals or departures at the transportation terminal, or any combination thereof. In some implementations, the operation 800 may proceed to block 804 at which the route selection system may determine another route in response to the estimated travel time exceeding a threshold value.

Figure 9:
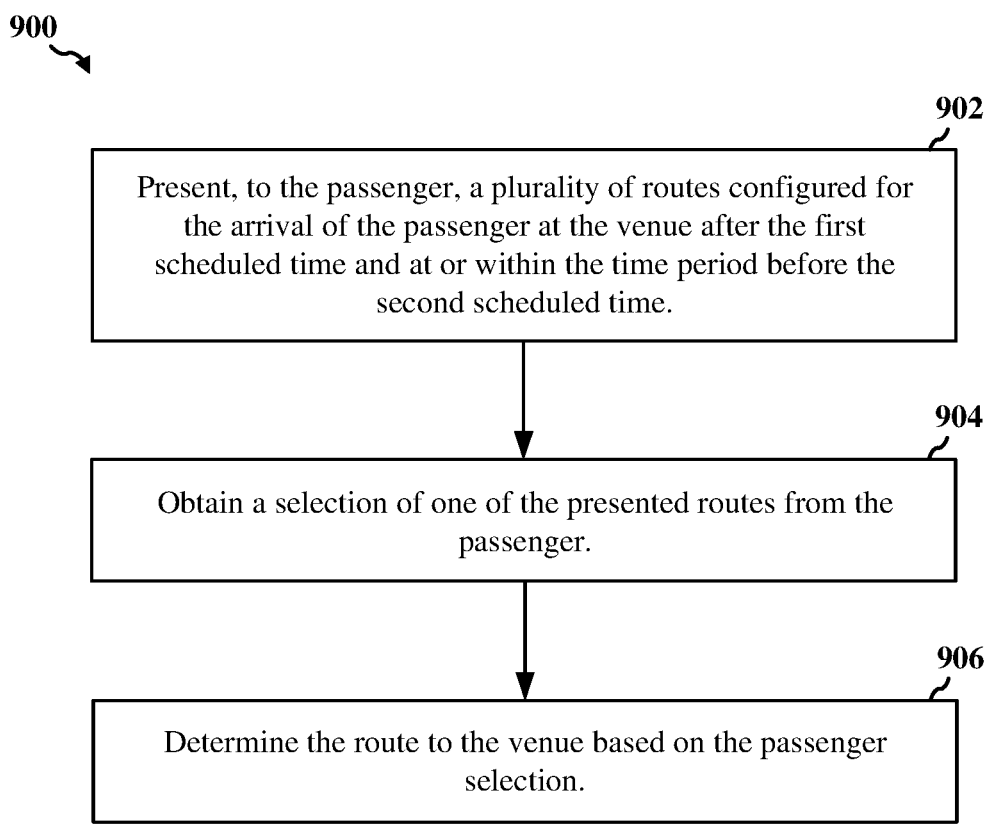
FIG. 9 shows a flow chart depicting an example operation for determining the route to the venue based on a passenger selection, according to some implementations.

FIG. 9 shows a flowchart depicting an example operation 900 for determining routes for a vehicle, according to some other implementations. In various implementations, the operation 900 may be performed by the route selection system 200 of FIG. 2. In some implementations, the operation 900 may be performed in conjunction with determining the second scheduled time in block 606 of FIG. 6. For example, at block 902, the route selection system may present, to the passenger, a plurality of routes configured for the arrival of the passenger at the venue after the scheduled time for the first event and at or within a time period before the scheduled time for the second event. At block 904, the route selection system may obtain a selection of one of the presented routes from the passenger. At block 906, the route selection system may determine the route to the venue based on the passenger selection.

In one implementation, the route to the venue is determined by the route selection system 200 of FIG. 2. In some implementations, the route to the venue may be determined by a device or system associated with the vehicle. In other implementations, the route to the venue may be determined by a server or network entity in response to a route request received from the vehicle. For example, after determining that the vehicle will not arrive at the venue by the first scheduled time, the vehicle may send a route request to the server or network entity. The route request may include (but is not limited to) the current location of the vehicle, the location of the venue, the scheduled time for the second event, the estimated travel time of the passenger, delays while in route to the venue, delays at the venue, the passenger's profile, passenger preferences, operator preferences, and so on.

In response to receiving the route request from the vehicle, the server or network entity may determine one or more routes the vehicle can take to arrive at the venue at or within the time period before the second scheduled time. In various implementations, the server or network entity may use mapping services and/or mapping data to determine a plurality of routes that the vehicle can take for the passenger to arrive at the venue on time for the second event. In some instances, the server or network entity may determine one of the plurality of routes to the venue based on passenger preferences, operator preferences, or both. The server or network entity may send the determined route to the vehicle. In other instances, the server or network entity may send some or all of the determined routes to the vehicle. In response thereto, the vehicle may determine one of the routes based on the passenger preferences, the operator preferences, or both.

In various implementations, one or more determined routes may be presented on a display screen viewable by the passenger. In some instances, the server or network entity may determine the routes to be presented to the passenger. In other instances, a device or system associated with the vehicle may determine the routes to be presented to the passenger. The display screen may be a touch-sensitive display screen that can receive a user touch input or gesture and perform one or more corresponding operations. For example, a user selection of one of the presented routes (e.g., a user touch input on a corresponding icon or element presented on the display screen) may cause the vehicle to drive to the venue along the route selected by the passenger.

In some implementations, the display screen may be integrated within the vehicle, for example, such as an in-vehicle infotainment (IVI) system. In other implementations, the display screen may be part of a user device or UE such as (but not limited to) a smartphone, smartwatch, laptop computer, tablet computer, and so on. In some aspects, the vehicle may transmit one or more determined routes to the passenger's user device for presenting to the passenger. The user device may receive a selection of one of the presented routes from the passenger, and may transmit an indication of the selected route to the vehicle. The vehicle may drive the passenger to the venue along the passenger-selected route.

In some other implementations, the route may be determined from a plurality of different routes to the venue based on one or more passenger preferences. In some aspects, the passenger preferences may be included in the passenger's profile and provided to the vehicle prior to picking up the passenger. In other aspects, the passenger preferences may be provided to vehicle via as suitable user interface such as (but not limited) to the IVI system or the user device.

The vehicle and the server or network entity may communicate with one another using any suitable communications network or communications protocol. In some implementations, the vehicle and the server or network entity may send signals, data, and other information to each other using communications links such as (but not limited to) a V2I link, a V2X link, a V2N link, sidelink channel or PC5 link, one or more physical channels of a 5G NR access network (e.g., a PUSCH, PDSCH, PRACH, NPBCH, NDSCH, NUSCH, and so on), a DSRC link, a Wi-Fi channel, a P2P communications link, a UWB link, a BLE link, or any combination thereof.

Implementation examples are described in the following numbered clauses:

1. A system, including:
   a memory; and
   one or more processors communicatively coupled to the memory, the one or more processors configured to:
      obtain a first scheduled time for a first event at a venue for a passenger of an autonomous vehicle;
      determine whether the autonomous vehicle will arrive at the venue by the first scheduled time;
      in response to a determination that the autonomous vehicle will not arrive at the venue by the first scheduled time, obtain a second scheduled time for a second event at the venue; and
      determine a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

2. The system of clause 1, where the second event is a later occurrence of the first event.

3. The system of any of clauses 1-2, where the one or more passenger preferences includes a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof.

4. The system of clause 3, where the one or more passenger preferences are received from a profile of the passenger stored in a network entity, a mobile computing device associated with the passenger, a user interface of the autonomous vehicle, a verbal indication by the passenger, or any combination thereof.

5. The system of any of clauses 1-4, where the one or more operator preferences includes a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof.

6. The system of any of clauses 1-5, where the operator is associated with a crowdsourcing application, and the one or more operator preferences includes a preference for routes associated with a greatest amount of revenue attributed to services provided by the vehicle.

7. The system of any of clauses 1-6, where the second scheduled time is based at least in part on an estimated travel time of the passenger from an exit point of the autonomous vehicle at or near the venue to an entry point of the second event.

8. The system of clause 7, where the estimated travel time is based at least in part on a physical attribute of the passenger, a presence of infants or children with the passenger, an age of the passenger, an amount of luggage or cargo with the passenger, weather conditions along a route to the venue, weather conditions at the venue, traffic conditions along the route to the venue, traffic conditions at the venue, police activity at the venue, a security breach at the venue, or any combination thereof.

9. The system of clause 7, where the estimated travel time is based at least in part on wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof.

10. The system of clause 7, where the one or more processors are further configured to:
   determine the estimated travel time based on a willingness of the passenger to run from the exit point of the autonomous vehicle to the entry point of the second event, a priority level of the passenger's admission to the second event, changes in wait times to enter the second event, a change in location of the second event, or any combination thereof.

11. The system of any of clauses 7-10, where the venue includes a transportation terminal, and the estimated travel time is based at least in part on wait times for checking baggage at the transportation terminal, wait times for obtaining a travel ticket or boarding pass at the transportation terminal, wait times for passing through security lines at the transportation terminal, delays associated with traveling with one or more pets, wait times for food service at the transportation terminal, a size of the transportation terminal, a layout of the transportation terminal, entry points of the transportation terminal, a level of activity at the transportation terminal, a level of the passenger's familiarity with the transportation terminal, a security pre-screening status of the passenger, a pre-boarding status of the passenger, an absence of carry-on luggage of the passenger, a preferred traveler status of the passenger, or any combination thereof.

12. The system of clause 11, where the one or more processors are further configured to:
determine the estimated travel time based on changes in the wait times, changes in departure gates, delays in scheduled arrivals or departures at the transportation terminal, or any combination thereof.

13. The system of clause 12, where the one or more processors are further configured to determine another route to the venue in response to the estimated travel time exceeding a threshold value.

14. The system of any of clauses 1-13, where the venue includes an airport, the first event includes a first airline flight to a destination, and the second event includes a second airline flight to the destination.

15. The system of clause 14, where the one or more processors are further configured to:
retrieve one or more of a flight number of the first airline flight, an airline company associated with the first airline flight, a departure time of the first airline flight, or a departure gate of the first airline flight from a mobile computing device of the passenger.

16. The system of any of clauses 1-15, where the venue includes a movie theater complex, the first event includes a first showing of a movie, and the second event includes a second showing of the movie.

17. The system of any of clauses 1-16, where the determined route is a scenic route, an energy-efficient route, a route that avoids freeways, a route that minimizes bridge crossings, a route that enhances passenger safety, a route that passes a point of interest, a route along which one or more additional passengers are to be picked by the autonomous vehicle, a route indicated by the passenger, a route alongside one or more advertisements, a route associated with ride-sharing, a route alongside passenger drop-off or pick-up locations, a route alongside food delivery drop-off or pick-up locations, a route alongside package drop-off or pick-up locations, an energy-efficient route, a fastest route, a route alongside rest areas, a route alongside or near gas stations, a route alongside or near service stations, a route alongside or near electric vehicle charging stations, a route that offsets costs to the passenger, a route that allows the vehicle to dynamically charge the vehicle, a route alongside rest areas, or any combination thereof.

18. The system of any of clauses 1-17, where the one or more processors are further configured to:
present, to the passenger, a plurality of routes configured for the arrival of the passenger at the venue after the scheduled time for the first event and at or within a time period before the scheduled time for the second event;
obtain a selection of one of the presented routes from the passenger; and
determine the route to the venue based on the passenger selection.

19. A method of determining routes for an autonomous vehicle, including:
obtaining a first scheduled time for a first event at a venue for a passenger;
determining whether the autonomous vehicle will arrive at the venue by the first scheduled time;
obtaining a second scheduled time for a second event at the venue in response to a determination that the autonomous vehicle will not arrive at the venue by the first scheduled time; and
determining a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

20. The method of clause 19, where the second event includes a later occurrence of the first event.

21. The method of any of clauses 19-20, where the one or more passenger preferences includes a preference for scenic routes, a preference for energy-efficient routes, a preference for routes that avoid freeways, a preference for routes that minimize bridge crossings, a preference for routes that enhance passenger safety, a preference for routes that pass one or more points of interest, or a preference for picking up additional passengers along the alternate route.

22. The method of any of clauses 19-21, where the one or more operator preferences includes a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof.

23. The method of any of clauses 19-22, where the second scheduled time is based at least in part on an estimated travel time of the passenger from an exit point of the autonomous vehicle at or near the venue to an entry point of the second event.

24. The method of clause 23, where the estimated travel time is based at least in part on a physical attribute of the passenger, a presence of infants or children with the passenger, an age of the passenger, an amount of luggage or cargo with the passenger, weather conditions along a route to the venue, weather conditions at the venue, traffic conditions along the route to the venue, traffic conditions at the venue, police activity at the venue, a security breach at the venue, wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof.

25. The method of any of clauses 23-24, further including:
determining the estimated travel time based on changes in the wait times, changes in departure gates, delays in scheduled arrivals or departures at the transportation terminal, or any combination thereof.

26. The method of clause 25, further including:
determining another route to the venue in response to the estimated travel time exceeding a threshold value.

27. A system, including:
means for obtaining a first scheduled time for a first event at a venue for a passenger of an autonomous vehicle;
means for determining whether the autonomous vehicle will arrive at the venue by the first scheduled time;
means for obtaining a second scheduled time for a second event at the venue in response to a determination that the autonomous vehicle will not arrive at the venue by the first scheduled time; and
means for determining a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

28. The system of clause 27, where the second scheduled time is based at least in part on an estimated travel time of the passenger from an exit point of the autonomous vehicle at or near the venue to an entry point of the second event.

29. The system of any of clauses 27-28, where:
the one or more passenger preferences includes a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof; and
the one or more operator preferences includes a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for the fastest route, a preference for routes alongside rest areas, a preference for routes alongside or near gas stations, a preference for routes alongside or near service stations, a preference for routes alongside or near electric vehicle charging stations, or any combination thereof.

30. A non-transitory computer-readable medium storing computer executable code, including:
obtaining a first scheduled time for a first event at a venue for a passenger of an autonomous vehicle;
determining whether the autonomous vehicle will arrive at the venue by the first scheduled time;
obtaining a second scheduled time for a second event at the venue in response to a determination that the autonomous vehicle will not arrive at the venue by the first scheduled time; and
determining a route to the venue based on one or more preferences of the passenger, one or more preferences of an operator of the autonomous vehicle, or any combination thereof, where the determined route is configured for arrival of the passenger at the venue after the first scheduled time and at or within a time period before the second scheduled time.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system, comprising:
a memory; and
one or more processors communicatively coupled to the memory, the one or more processors configured to:
obtain, by a route selection processing system for an autonomous vehicle in an autonomous mode of operation, a first scheduled time for a first event at a venue for a passenger of the autonomous vehicle;
determine, by the route selection processing system for, and during transit for the passenger of, the autonomous vehicle, whether the autonomous vehicle will arrive at the venue by the first scheduled time via a route to the venue;
in response to a determination that the autonomous vehicle will not arrive at the venue by the first scheduled time, obtain, by the route selection processing system of, and during the transit for the passenger of, the autonomous vehicle, a second scheduled time for a second event at the venue;
determine an alternate route to the venue during the transit, through wireless access to a route conditions system by the route selection processing system, based on one or more preferences of the passenger, one or more preferences of an operator of the autonomous vehicle, or any combination thereof, wherein the determined alternate route is configured for arrival of the passenger at the venue after the first scheduled time and at or within a time period before the second scheduled time; and
provide, by the route selection processing system, a command generated by the route selection processing system to the autonomous vehicle during the transit for the passenger of the autonomous vehicle, the command to cause a vehicle controller of the autonomous vehicle to autonomously switch from the route to the determined alternate route.

2. The system of claim 1, wherein the second event comprises a later occurrence of the first event.

3. The system of claim 1, wherein the one or more passenger preferences includes a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof.

4. The system of claim 3, wherein the one or more passenger preferences are received from a profile of the passenger stored in a network entity, a mobile computing device associated with the passenger, a user interface of the autonomous vehicle, a verbal indication by the passenger, or any combination thereof.

5. The system of claim 1, wherein the one or more operator preferences includes a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for a fastest route, a preference for routes alongside rest areas, a preference for routes alongside or near gas stations, a preference for routes alongside or near service stations, a preference for routes alongside or near electric vehicle charging stations, or any combination thereof.

6. The system of claim 1, wherein the operator is associated with a crowdsourcing application, and the one or more operator preferences includes a preference for routes associated with a greatest amount of revenue attributed to services provided by the vehicle.

7. The system of claim 1, wherein the second scheduled time is based at least in part on an estimated travel time of the passenger from an exit point of the autonomous vehicle at or near the venue to an entry point of the second event.

8. The system of claim 7, wherein the estimated travel time is based at least in part on a physical attribute of the passenger, a presence of infants or children with the passenger, an age of the passenger, an amount of luggage or cargo with the passenger, weather conditions along a route to the venue, weather conditions at the venue, traffic conditions along the determined alternate route to the venue, traffic conditions at the venue, police activity at the venue, a security breach at the venue, or any combination thereof.

9. The system of claim 7, wherein the estimated travel time is based at least in part on wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof.

10. The system of claim 7, wherein the one or more processors are further configured to:
determine the estimated travel time based on a willingness of the passenger to run from the exit point of the autonomous vehicle to the entry point of the second event, a priority level of the passenger's admission to the second event, changes in wait times to enter the second event, a change in location of the second event, or any combination thereof.

11. The system of claim 7, wherein the venue comprises a transportation terminal, and the estimated travel time is based at least in part on wait times for checking baggage at the transportation terminal, wait times for obtaining a travel ticket or boarding pass at the transportation terminal, wait times for passing through security lines at the transportation terminal, delays associated with traveling with one or more pets, wait times for food service at the transportation terminal, a size of the transportation terminal, a layout of the transportation terminal, entry points of the transportation terminal, a level of activity at the transportation terminal, a level of the passenger's familiarity with the transportation terminal, a security pre-screening status of the passenger, a pre-boarding status of the passenger, an absence of carry-on luggage of the passenger, a preferred traveler status of the passenger, or any combination thereof.

12. The system of claim 11, wherein the one or more processors are further configured to:
determine the estimated travel time based on changes in the wait times, changes in departure gates, delays in scheduled arrivals or departures at the transportation terminal, or any combination thereof.

13. The system of claim 12, wherein the one or more processors are further configured to determine another route to the venue in response to the estimated travel time exceeding a threshold value.

14. The system of claim 1, wherein the venue comprises an airport, the first event comprises a first airline flight to a destination, and the second event comprises a second airline flight to the destination.

15. The system of claim 14, wherein the one or more processors are further configured to:
retrieve one or more of a flight number of the first airline flight, an airline company associated with the first airline flight, a departure time of the first airline flight, or a departure gate of the first airline flight from a mobile computing device of the passenger.

16. The system of claim 1, wherein the venue comprises a movie theater complex, the first event comprises a first showing of a movie, and the second event comprises a second showing of the movie.

17. The system of claim 1, wherein the determined alternate route is a scenic route, an energy-efficient route, a route that avoids freeways, a route that minimizes bridge crossings, a route that enhances passenger safety, a route that passes a point of interest, a route along which one or more additional passengers are to be picked by the autonomous vehicle, a route indicated by the passenger, a route alongside one or more advertisements, a route associated with ride-sharing, a route alongside passenger drop-off or pick-up locations, a route alongside food delivery drop-off or pick-up locations, a route alongside package drop-off or pick-up locations, an energy-efficient route, a fastest route, a route alongside rest areas, a route alongside or near gas stations, a route alongside or near service stations, a route alongside or near electric vehicle charging stations, a route that offsets costs to the passenger, a route that allows the vehicle to dynamically charge the vehicle, a route alongside rest areas, or any combination thereof.

18. The system of claim 1, wherein the one or more processors are further configured to:
present, to the passenger, a plurality of routes configured for the arrival of the passenger at the venue after the scheduled time for the first event and at or within the time period before the scheduled time for the second event;
obtain a selection of one of the presented routes from the passenger; and
determine the alternate route to the venue based on the passenger selection.

19. A method of determining routes for an autonomous vehicle, comprising:
obtaining, by a route selection processing system for the autonomous vehicle in an autonomous mode of operation, a first scheduled time for a first event at a venue for a passenger;
determining, by the route selection processing system for, and during transit for the passenger of, the autonomous vehicle, whether the autonomous vehicle will arrive at the venue by the first scheduled time via a route to the venue;
obtaining, by the route selection processing system of, and during the transit for the passenger of, the autonomous vehicle, a second scheduled time for a second event at the venue in response to a determination that the autonomous vehicle will not arrive at the venue by the first scheduled time;
determining an alternate route to the venue during the transit, through wireless access to a route conditions system by the route selection processing system, based on one or more preferences of the passenger, one or more preferences of an operator of the autonomous vehicle, or any combination thereof, wherein the determined alternate route is configured for arrival of the passenger at the venue after the first scheduled time and at or within a time period before the second scheduled time; and
providing, by the route selection processing system, a command generated by the route selection processing system to the autonomous vehicle during the transit for the passenger of the autonomous vehicle, the command causing a vehicle controller of the autonomous vehicle to autonomously switch from the route to the determined alternate route.

20. The method of claim 19, wherein the second event comprises a later occurrence of the first event.

21. The method of claim 19, wherein the one or more passenger preferences includes a preference for scenic routes, a preference for energy-efficient routes, a preference for routes that avoid freeways, a preference for routes that minimize bridge crossings, a preference for routes that enhance passenger safety, a preference for routes that pass one or more points of interest, or a preference for picking up additional passengers along the alternate route.

22. The method of claim 19, wherein the one or more operator preferences includes a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for a fastest route, a preference for routes alongside rest areas, a preference for routes alongside or near gas stations, a preference for routes alongside or near service stations, a preference for routes alongside or near electric vehicle charging stations, or any combination thereof.

23. The method of claim 19, wherein the second scheduled time is based at least in part on an estimated travel time of the passenger from an exit point of the autonomous vehicle at or near the venue to an entry point of the second event.

24. The method of claim 23, wherein the estimated travel time is based at least in part on a physical attribute of the passenger, a presence of infants or children with the passenger, an age of the passenger, an amount of luggage or cargo with the passenger, weather conditions along a route to the venue, weather conditions at the venue, traffic conditions along the determined alternate route to the venue, traffic conditions at the venue, police activity at the venue, a security breach at the venue, wait times for obtaining tickets at the venue, wait times for passing through security lines at the venue, delays associated with traveling with one or more pets, a size of the venue, a layout of the venue, entry points of the venue, a level of activity at the venue, a level of the passenger's familiarity with the venue, or any combination thereof.

25. The method of claim 23, further comprising:
determining the estimated travel time based on changes in wait times, changes in departure gates, delays in scheduled arrivals or departures at a transportation terminal, or any combination thereof.

26. The method of claim 25, further comprising:
determining another route to the venue in response to the estimated travel time exceeding a threshold value.

27. A system, comprising:
means for obtaining, by a route selection processing system for an autonomous vehicle in an autonomous mode of operation, a first scheduled time for a first event at a venue for a passenger of the autonomous vehicle;
means for determining, by the autonomous vehicle and during transit for the passenger of the autonomous vehicle, whether the autonomous vehicle will arrive at the venue by the first scheduled time via a route to the venue;
means for obtaining, by the autonomous vehicle and during transit for the passenger of the autonomous vehicle, a second scheduled time for a second event at the venue in response to a determination that the autonomous vehicle will not arrive at the venue by the first scheduled time;
means for determining an alternate route to the venue during the transit, through wireless access to a route conditions system by the route selection processing system, based on one or more preferences of the passenger, one or more preferences of an operator of the autonomous vehicle, or any combination thereof, wherein the determined alternate route is configured for arrival of the passenger at the venue after the first scheduled time and at or within a time period before the second scheduled time; and
means for providing, by the route selection processing system, a command generated by the route selection processing system to the autonomous vehicle during the transit for the passenger of the autonomous vehicle, the command causing a vehicle controller of the autonomous vehicle to autonomously switch from the route to the determined alternate route.

28. The system of claim 27, wherein the second scheduled time is based at least in part on an estimated travel time of the passenger from an exit point of the autonomous vehicle at or near the venue to an entry point of the second event.

29. The system of claim 27, wherein:
the one or more passenger preferences includes a preference for scenic routes, a preference for energy-efficient routes, a preference for routes that avoid freeways, a preference for routes that minimize bridge crossings, a preference for routes that enhance passenger safety, a preference for routes that pass one or more points of interest, a preference for picking up additional passengers along the alternate route, or any combination thereof; and
the one or more operator preferences includes a preference for routes alongside one or more advertisements, a preference for routes associated with ride-sharing, a preference for routes alongside passenger drop-off or pick-up locations, a preference for routes alongside food delivery drop-off or pick-up locations, a preference for routes alongside package drop-off or pick-up locations, a preference for energy-efficient routes, a preference for a fastest route, a preference for routes alongside rest areas, a preference for routes alongside or near gas stations, a preference for routes alongside or near service stations, a preference for routes alongside or near electric vehicle charging stations, or any combination thereof.

30. A non-transitory computer-readable medium storing computer executable code, the code when executed by a processor causes the processor to:
obtain, by a route selection processing system for an autonomous vehicle in an autonomous mode of operation, a first scheduled time for a first event at a venue for a passenger of the autonomous vehicle;

determine, by the route selection processing system for, and during transit for the passenger of, the autonomous vehicle, whether the autonomous vehicle will arrive at the venue by the first scheduled time via a route to the venue;

obtain, by the route selection processing system of, and during the transit for the passenger of, the autonomous vehicle, a second scheduled time for a second event at the venue in response to a determination that the autonomous vehicle will not arrive at the venue by the first scheduled time;

determine an alternate route to the venue during the transit, through wireless access to a route conditions system by the route selection processing system, based on one or more preferences of the passenger, one or more preferences of an operator of the autonomous vehicle, or any combination thereof, wherein the determined alternate route is configured for arrival of the passenger at the venue after the first scheduled time and at or within a time period before the second scheduled time; and provide, by the route selection processing system, a command generated by the route selection processing system to the autonomous vehicle during the transit for the passenger of the autonomous vehicle, the command to cause a vehicle controller of the autonomous vehicle to autonomously switch from the route to the determined alternate route.

\* \* \* \* \*